US012755177B2

(12) United States Patent
Susa et al.

(10) Patent No.: US 12,755,177 B2
(45) Date of Patent: Oct. 6, 2026

(54) COMPUTATION DEVICE, QUANTUM STATE GENERATION DEVICE, COMPUTATION METHOD, QUANTUM STATE GENERATION METHOD, AND PROGRAM

(71) Applicant: NEC Corporation, Minato-ku (JP)

(72) Inventors: Yuki Susa, Tokyo (JP); Aiko Yamaguchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 606 days.

(21) Appl. No.: 18/222,833

(22) Filed: Jul. 17, 2023

(65) Prior Publication Data

US 2024/0037435 A1 Feb. 1, 2024

(30) Foreign Application Priority Data

Jul. 29, 2022 (JP) ................................ 2022-121218

(51) Int. Cl.
*G06N 10/20* (2022.01)

(52) U.S. Cl.
CPC .................................. *G06N 10/20* (2022.01)

(58) Field of Classification Search
CPC ...................................................... G06N 10/20
USPC ............................................................ 706/62
See application file for complete search history.

(56) References Cited

U.S. PATENT DOCUMENTS

2010/0321117 A1* 12/2010 Gan .......................... H03L 7/26 331/3
2017/0104493 A1* 4/2017 Goto ...................... H10N 60/12
2018/0341874 A1 11/2018 Puri et al.
2024/0403687 A1* 12/2024 Peronnin ................ G06N 10/40

FOREIGN PATENT DOCUMENTS

JP 2017-073106 A 4/2017
JP 2021-132188 A 9/2021

OTHER PUBLICATIONS

Kienzler, et al., "Quantum harmonic oscillator state synthesis by reservoir engineering", Science, Jan. 2, 2015, vol. 347, Issue 6217, 2015 (Year: 2015).*
Danilishin, et al., "Creation of a quantum oscillator by classical control", arXiv: 0809.2024v2 [quant-ph] Oct. 8, 2008 (Year: 2008).*
Japanese Official Communication for JP Application No. 2022-121218, mailed on Apr. 28, 2026 with English Translation.

* cited by examiner

*Primary Examiner* — Tsu-Chang Lee
(74) *Attorney, Agent, or Firm* — Sughrue Mion, PLLC

(57) ABSTRACT

A computation device generates a plan that controls an oscillator configured to perform parametric oscillation such that an intensity of a pump signal that is input to the oscillator increases from a first value according to an elapsed time and then decreases to a second value, and a magnitude of a detuning between a resonance frequency of the oscillator and an oscillation frequency of the oscillator increases from a third value according to the elapsed time and then decreases to a fourth value. The computation device generates a quantum state of the oscillator by controlling the oscillator based on the plan. The computation device performs computation using the generated quantum state.

6 Claims, 9 Drawing Sheets

COMPUTATION DEVICE, QUANTUM STATE GENERATION DEVICE, COMPUTATION METHOD, QUANTUM STATE GENERATION METHOD, AND PROGRAM

This application is based upon and claims the benefit of priority from Japanese patent application No. 2022-121218, filed on Jul. 29, 2022, the disclosure of which is incorporated herein in its entirety by reference.

TECHNICAL FIELD

The present disclosure relates to a computation device, a quantum state generation device, a computation method, a quantum state generation method, and a program.

BACKGROUND ART

An oscillator that performs parametric oscillation is used to generate a superposition state of a plurality of distinguishable quantum states, and the generated superposition state can be used to perform computations such as quantum annealing or a quantum calculation algorithm using quantum gates (for example, see Japanese Unexamined Patent Application, First Publication No. 2017-073106). Examples of quantum calculation algorithms using quantum gates include Shor's prime factorization algorithm and Grover's search algorithm.

SUMMARY

When a superposition state of a plurality of distinguishable quantum states is generated using an oscillator that performs parametric oscillation, it is preferable that the time required to generate the superposition state is as short as possible.

An example object of the present disclosure is to provide a computation device, a quantum state generation device, a computation method, a quantum state generation method, and a program that are capable of solving the problem described above.

According to a first example aspect of the present disclosure, a computation device includes: a memory configured to store instructions; and a processor configured to execute the instructions to: generate a plan that controls an oscillator configured to perform parametric oscillation such that an intensity of a pump signal that is input to the oscillator increases from a first value according to an elapsed time and then decreases to a second value, and a magnitude of a detuning between a resonance frequency of the oscillator and an oscillation frequency of the oscillator increases from a third value according to the elapsed time and then decreases to a fourth value; generate a quantum state of the oscillator by controlling the oscillator based on the plan; and perform computation using the generated quantum state.

According to a second example aspect of the present disclosure, a quantum state generation device includes: a memory configured to store instructions; and a processor configured to execute the instructions to: generate a plan that controls an oscillator configured to perform parametric oscillation such that an intensity of a pump signal that is input to the oscillator increases from a first value according to an elapsed time and then decreases to a second value, and a magnitude of a detuning between a resonance frequency of the oscillator and an oscillation frequency of the oscillator increases from a third value according to the elapsed time and then decreases to a fourth value; and generate a quantum state of the oscillator by controlling the oscillator based on the plan.

According to a third example aspect of the present disclosure, a computation method includes: generating a plan that controls an oscillator configured to perform parametric oscillation such that an intensity of a pump signal that is input to the oscillator increases from a first value according to an elapsed time and then decreases to a second value, and a magnitude of a detuning between a resonance frequency of the oscillator and an oscillation frequency of the oscillator increases from a third value according to the elapsed time and then decreases to a fourth value; generating a quantum state of the oscillator by controlling the oscillator based on the plan; and performing computation using the generated quantum state.

According to a fourth example aspect of the present disclosure, a quantum state generation method includes: generating a plan that controls an oscillator configured to perform parametric oscillation such that an intensity of a pump signal that is input to the oscillator increases from a first value according to an elapsed time and then decreases to a second value, and a magnitude of a detuning between a resonance frequency of the oscillator and an oscillation frequency of the oscillator increases from a third value according to the elapsed time and then decreases to a fourth value; and generating a quantum state of the oscillator by controlling the oscillator based on the plan.

According to a fifth example aspect of the present disclosure, a program causes a computation device configured to perform computation using an oscillator configured to perform parametric oscillation to execute: generating a plan that controls the oscillator such that an intensity of a pump signal that is input to the oscillator increases from a first value according to an elapsed time and then decreases to a second value, and a magnitude of a detuning between a resonance frequency of the oscillator and an oscillation frequency of the oscillator increases from a third value according to the elapsed time and then decreases to a fourth value; generating a quantum state of the oscillator by controlling the oscillator based on the plan; and performing computation using the generated quantum state. The program may be stored in a non-transitory computer-readable recording medium.

According to a sixth example aspect of the present disclosure, a program is used for a quantum state generation device configured to generate a quantum state of an oscillator configured to perform parametric oscillation by controlling the an oscillator. The program causes the quantum state generation device to execute: generating a plan that controls the oscillator such that an intensity of a pump signal that is input to the oscillator increases from a first value according to an elapsed time and then decreases to a second value, and a magnitude of a detuning between a resonance frequency of the oscillator and an oscillation frequency of the oscillator increases from a third value according to the elapsed time and then decreases to a fourth value; and generating the quantum state of the oscillator by controlling the oscillator based on the plan. The program may be stored in a non-transitory computer-readable recording medium.

According to the present disclosure, the time required to generate a superposition state can be made relatively short when generating a superposition state of a plurality of distinguishable quantum states using an oscillator that performs parametric oscillation.

EXAMPLE EMBODIMENT

Hereunder, example embodiments of the present disclosure will be described. However, the following example embodiments does not limit the invention according to the claims. Furthermore, not all combinations of features described in the example embodiments may not be essential to the solution means of the invention.

Figure 1:
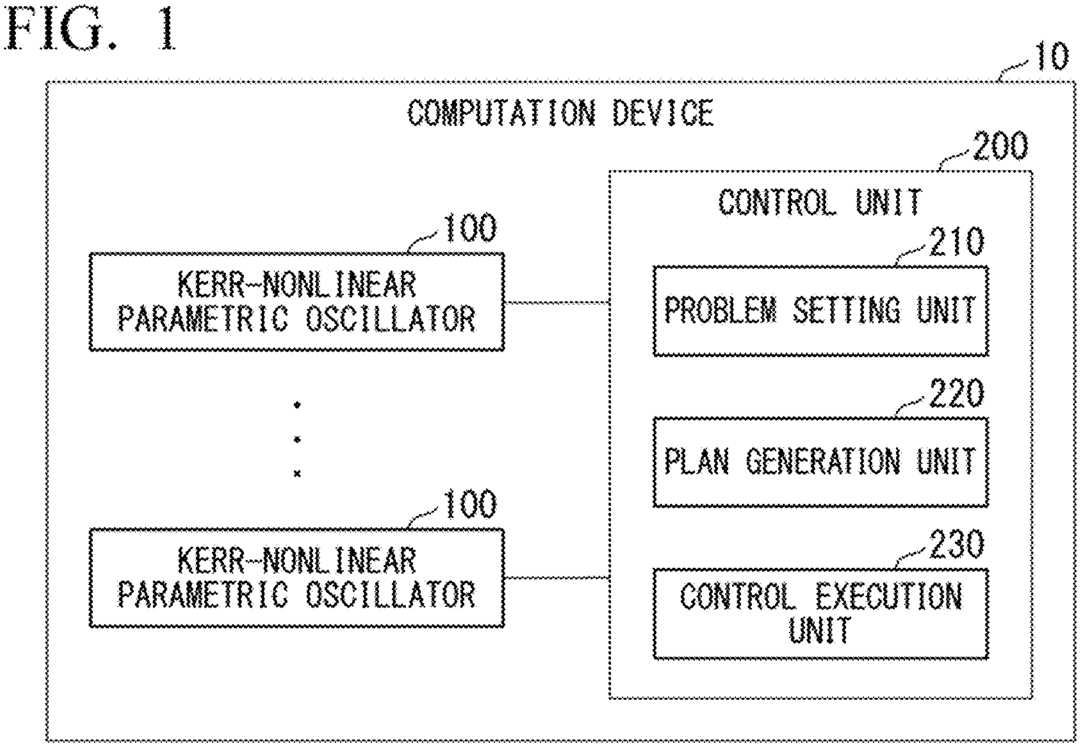
FIG. 1 is a diagram showing an example of a configuration of a computation device according to some example embodiments.

FIG. 1 is a diagram showing an example of a configuration of a computation device according to some example embodiments. In the configuration shown in FIG. 1, the computation device 10 includes a plurality of Kerr-nonlinear parametric oscillators (KPOs) 100, and a control unit (controller) 200. The control unit 200 includes a problem setting unit 210, a plan generation unit 220, and a control execution unit 230.

The computation device 10 performs computation using the Kerr-nonlinear parametric oscillators 100. Specifically, the computation device 10 performs quantum computing (computation using quantum mechanics) such as solving optimization problems by quantum annealing using the quantum states of the Kerr-nonlinear parametric oscillators 100 as quantum bits.

In particular, the computation device 10 controls the Kerr-nonlinear parametric oscillators 100 such that the quantum state of the Kerr-nonlinear parametric oscillators 100 is in a superposition state of two coherent states. A superposition state of two coherent states is also referred to as a cat state.

The computation device 10 uses the obtained cat state to perform quantum computing, such as solving optimization problems by quantum annealing, or executing a quantum calculation algorithm using quantum gates, using the generated cat state as an initial value of the variables. For example, the cat state generated by the computation device 10 can be used in Shor's prime factorization algorithm and Grover's search algorithm.

The computation device 10 corresponds to an example of a computation device. Furthermore, the computation device 10 also corresponds to an example of a quantum state generation device.

The Kerr-nonlinear parametric oscillators 100 are nonlinear resonant circuits having Kerr nonlinearity. When the resonance frequency of the Kerr-nonlinear parametric oscillators 100 is modulated at a frequency approximately twice the resonance frequency, the Kerr-nonlinear parametric oscillators 100 operate as parametrically oscillating oscillators.

The Kerr-nonlinear parametric oscillators 100 may be configured using Josephson parametric oscillators (JPO). However, the configuration of the Kerr-nonlinear parametric oscillators 100 is not limited to this.

Figure 2:
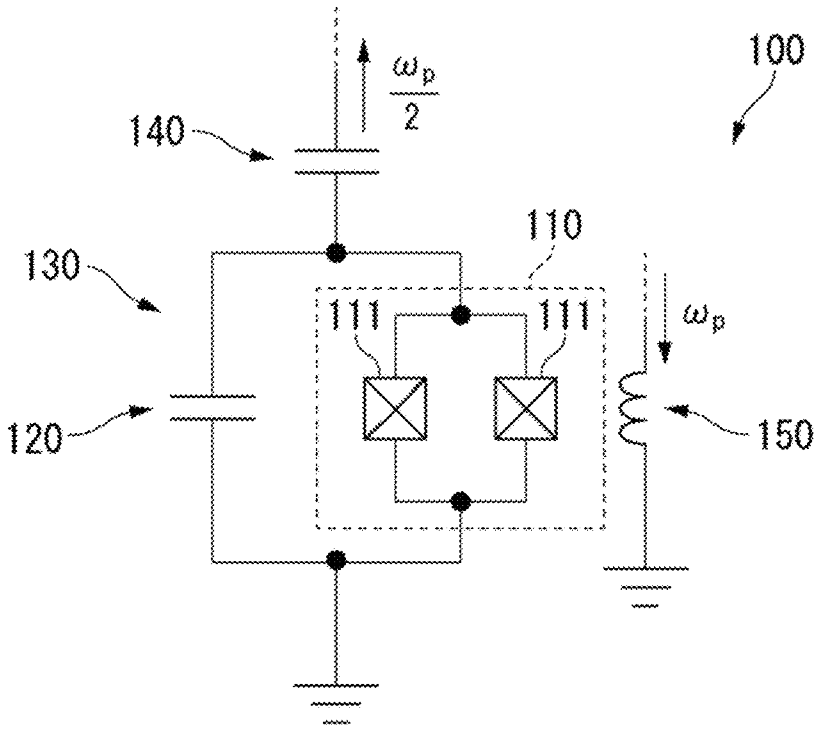
FIG. 2 is a diagram showing an example of a configuration of a Kerr-nonlinear parametric oscillator according to some example embodiments.

FIG. 2 is a diagram showing an example of a configuration of a Kerr-nonlinear parametric oscillator 100. In the configuration shown in FIG. 2, the Kerr-nonlinear parametric oscillator 100 includes a superconducting quantum interference device (SQUID) 110, capacitors 120 and 140, and a magnetic field generation unit 150. The superconducting quantum interference device 110 includes a superconducting loop provided with two Josephson junctions 111.

The magnetic field generation unit 150 is configured using a coil and generates a magnetic field according to the current flowing through the magnetic field generation unit 150. The magnetic field generation unit 150 and the superconducting quantum interference device 110 are magnetically coupled, and magnetic flux is applied to the superconducting quantum interference device 110 as a result of the magnetic field generation unit 150 generating a magnetic field.

The loop having the superconducting quantum interference device 110 and the capacitor 120 constitutes a resonant circuit 130. The resonance frequency of the resonant circuit 130 is controlled by the magnitude of the current flowing through the magnetic field generation unit 150. The inductance of the superconducting quantum interference device 110 periodically changes according to periodic changes in the magnetic field generated by applying an alternating current to the magnetic field generation unit 150. As a result, the resonance frequency of the resonant circuit 130 periodically changes. The periodic changes in the resonance frequency result in the resonant circuit 130 parametrically resonating with the changes in the magnetic field (alternating magnetic field).

The magnetic field generation unit 150 generating a magnetic field can also be regarded as the magnetic field generation unit 150 outputting an electromagnetic wave. The resonant circuit 130 parametrically resonating with the changes in the magnetic field can also be regarded as the resonant circuit 130 parametrically resonating with the electromagnetic wave output by the magnetic field generation unit 150.

When the resonance frequency of the resonant circuit 130 is close to half the frequency of the current flowing through the magnetic field generation unit 150 and the magnitude of the current flowing through the magnetic field generation unit 150 is greater than or equal to a certain magnitude, the resonant circuit 130 parametrically oscillates (excites) due to parametric resonance. The resonant circuit 130 oscillates at half the frequency of the frequency of the current flowing through the magnetic field generation unit 150.

The current flowing through the magnetic field generation unit 150 (the current the control unit 200 applies to the magnetic field generation unit 150) can be recognized as an input signal to the Kerr-nonlinear parametric oscillator 100, and is referred to as a pump signal. The frequency of the pump signal is the frequency of the current flowing through the magnetic field generation unit 150. The amplitude of the pump signal is the amplitude of the current flowing through the magnetic field generation unit 150.

The product $\beta=i*df/di$ of the amplitude (current amplitude) i of the alternating component of the current of the pump signal, in amperes (A), and the amount of change df/di in the resonance frequency f due to the current value, is referred to as the intensity of the pump signal, or the pump intensity. Here, "*" represents multiplication.

Because the amount of change df/di in the resonance frequency due to the current value is determined by the structure of the circuit and the frequency, the pump intensity $\beta$ is proportional to the current amplitude of the pump signal. Therefore, the pump intensity can be adjusted by adjusting the current amplitude of the pump signal.

Increasing the value of the pump intensity $\beta$ is also referred to as strengthening the pump intensity, or increasing the pump intensity.

Furthermore, the oscillation of the resonant circuit 130 is also referred to as oscillation of the Kerr-nonlinear parametric oscillator 100. When the angular frequency of the pump signal is denoted by $\Omega_p$, the oscillation angular frequency of the Kerr-nonlinear parametric oscillator 100 is $\omega_p/2$.

By observing that the Kerr-nonlinear parametric oscillator 100 outputs an electromagnetic wave having a frequency that is half the frequency of the pump signal, it can be confirmed that parametric oscillation is occurring.

The difference obtained by subtracting the resonance frequency from the oscillation frequency of the Kerr-nonlinear parametric oscillator 100 is referred to as the detuning, and is represented by $\Delta$. The detuning $\Delta$ is expressed by Equation (1) using the resonance frequency $\omega_0$ and the oscillation angular frequency $\omega_p/2$ of the Kerr-nonlinear parametric oscillator 100.

(Equation 1)

$$\Delta = \omega_0 - \frac{\omega_p}{2} \tag{1}$$

The coherent state generated inside the resonant circuit 130 corresponds to the quantum state of the Kerr-nonlinear parametric oscillator 100. The quantum state of the Kerr-nonlinear parametric oscillator 100 is observed by measuring the phase of the electromagnetic wave output from the Kerr-nonlinear parametric oscillator 100.

That is, there are two possible coherent states when the resonant circuit 130 parametrically oscillates, and each of the two coherent states corresponds to a quantum state. The quantum mechanical superposition state of these two coherent states corresponds to the cat state.

The control unit 200 controls the Kerr-nonlinear parametric oscillator 100. In particular, the control unit 200 changes the quantum state of the Kerr-nonlinear parametric oscillator 100 from a vacuum state to the cat state. Furthermore, the control unit 200 uses the obtained cat state to perform computation such as quantum annealing.

The change of a quantum state to a certain desired state is also referred to as generating a quantum state. For example, when the desired quantum state is the cat state, changing the quantum state of the Kerr-nonlinear parametric oscillator 100 to the cat state is also referred to as generating the cat state.

The processing performed by the control unit 200 that changes the quantum state of the Kerr-nonlinear parametric oscillator 100 from the vacuum state to the cat state, or to a quantum state that has failed to generate the cat state, is also referred to as cat state generation processing, or one cycle of cat state generation processing. The control unit 200 repeats cat state generation processing to search for a plan to perform control for generating the cat state.

The problem setting unit 210 sets the computation device 10 with a problem that is given as a problem to be solved by the computation device 10. For example, when the computation device 10 is given an optimization problem as the problem to be solved, the problem setting unit 210 sets the coupling between the Kerr-nonlinear parametric oscillators 100 such that an objective function and constraints of the optimization problem are reflected in the coupling between the Kerr-nonlinear parametric oscillators 100.

As mentioned above, the problem to be solved by the computation device 10 can be a variety of problems, such as quantum annealing or a problem using a quantum calculation algorithm using quantum gates.

The plan generation unit 220 establishes a plan for control of the Kerr-nonlinear parametric oscillator 100 by the control unit 200. Specifically, the plan generation unit 220 determines the value of a control parameter of the Kerr-nonlinear parametric oscillator 100 from the start to the end of the generation of the cat state.

The plan generation unit 220 may determine the value of the pump intensity and the value of the detuning. As described above, the pump intensity $\beta$ is the product of the current amplitude of the pump signal and the amount of change in the resonance frequency f due to the current value. As described above, the detuning is the difference obtained by subtracting the resonance frequency from the oscillation frequency of the Kerr-nonlinear parametric oscillator 100.

Alternatively, the plan generation unit 220 may determine the value of the pump intensity and the value of the frequency of the pump signal.

The frequency of the pump signal is also referred to as the pump frequency.

The control execution unit 230 controls the Kerr-nonlinear parametric oscillator 100 according to the control parameter value determined by the plan generation unit 220.

The control of the Kerr-nonlinear parametric oscillator 100 can be performed by adjusting the pump intensity and the pump frequency. When the plan generation unit 220 determines the value of the pump intensity and the value of the detuning, the control execution unit 230 may calculate the value of the pump frequency from the value of the pump intensity and the value of the detuning. The control execution unit 230 inputs the pump signal to the Kerr-nonlinear parametric oscillator 100 according to the obtained pump intensity and pump frequency. As a result, the control execution unit 230 executes control of the Kerr-nonlinear parametric oscillator 100.

When the plan generation unit 220 determines the value of the pump intensity and the value of the pump frequency, the control execution unit 230 inputs the pump signal to the Kerr-nonlinear parametric oscillator 100 according to the pump intensity and the pump frequency calculated by the plan generation unit 220.

In the following, an example will be described in which the plan generation unit 220 determines the value of the detuning and the value of the pump intensity as control parameter values of the Kerr-nonlinear parametric oscillator 100. However, the control parameters whose values are determined by the plan generation unit 220 are not limited to specific control parameters, and can be various parameters that enable the detuning and pump intensity to be calculated. For example, the plan generation unit 220 may determine the value of the pump intensity and the value of the pump frequency as described above.

The plan generation unit 220 generates a plan such that both the magnitude (absolute value) of the detuning and the pump intensity initially increase, and then decrease. The plan generation unit 220 may calculate the detuning and the pump intensity using a quadratic function or a function of degree 3 or higher that includes internal parameters. Here, the internal parameters included in the function are parameters among the parameters included in the function other than the arguments (which have a degree of freedom in the possible values).

The generation of a plan by the plan generation unit 220 and control of the Kerr-nonlinear parametric oscillator 100 by the control execution unit 230 may be repeated to search for internal parameter values that allow the cat state to be obtained. Alternatively, instead of controlling the Kerr-nonlinear parametric oscillator 100, the control execution unit 230 may simulate the generation of a quantum state in the Kerr-nonlinear parametric oscillator 100, and search for internal parameter values based on the simulation result.

In the following, the operation of the computation device 10 will be described using, as an example, a numerical experiment performed for confirming the operation of the computation device 10. Here, the numerical experiment refers to confirming the operation of the computation device 10, which is the operation confirmation target, by performing a calculation such as a simulation. Specifically, in the numerical experiment, as the processing performed by the control execution unit 230, the generation of a quantum state was simulated based on a plan generated by the plan generation unit 220, and the plan was evaluated by evaluating the simulation result. The generation of the quantum state was simulated by numerically solving the Schrödinger equation.

In the numerical experiment, the Hamiltonian represented by Equation (2) was used as the Hamiltonian of the Kerr-nonlinear parametric oscillator.

(Equation 2)

$$\hat{H}_{RWA} = \Delta(t/T)\hat{a}^{\dagger}\hat{a} - \frac{\chi}{2}\hat{a}^{\dagger 2}\hat{a}^{2} + \beta(t/T)\left(\hat{a}^{\dagger 2} + \hat{a}^{2}\right) \tag{2}$$

The Hamiltonian $H\hat{}_{RWA}$ shown in Equation (2) is an approximation of a rotating coordinate system representation of the Hamiltonian in a laboratory system. The circumflex can sometimes be represented by "^". For example, H with a circumflex is also denoted by H^.

T represents the generation time of the cat state. That is to say, T represents the time required to perform cat state generation processing. t represents the elapsed time from the start of cat state generation processing. The timing at which the time t has elapsed since the start of cat state generation processing is also denoted as the time after an elapsed time t.

t/T represents the ratio of the elapsed time t to the generation time T of the cat state.

Δ(t/T) represents the value of the detuning Δ after the elapsed time t. Δ(t/T) is represented by Equation (3).

(Equation 3)

$$\Delta(t/T) = \omega_0 - \chi - \frac{\omega_p(t/T)}{2} \tag{3}$$

a^ represents the annihilation operator. The annihilation operator is also denoted by $a\hat{}_{ann}$.

a^ with a dagger symbol represents the creation operator. The creation operator is also denoted by $a\hat{}_{cre}$.

χ represents the Kerr coefficient.

β(t/T) represents the value of the pump intensity β after the elapsed time t.

The Hamiltonian $H\hat{}_{KPO}$ of a laboratory system is represented by Equation (4).

(Equation 4)

$$\hat{H}_{KPO} = \omega_0\hat{a}^{\dagger}\hat{a} - \frac{\chi}{12}\left(\hat{a} + \hat{a}^{\dagger}\right)^4 + 2\beta(t/T)\left(\hat{a} + \hat{a}^{\dagger}\right)^2\cos\omega_p t \tag{4}$$

The rotating coordinate system representation $H\hat{}_{RF}$ of the Hamiltonian of a laboratory system is represented by Equation (5).

(Equation 5)

$$\hat{H}_{RF} = \left(\omega_c - \frac{\omega_p}{2}\right)\hat{a}^{\dagger}\hat{a} - \frac{\chi}{12}\left(\hat{a}e^{-i\frac{\omega_p}{2}t} + \hat{a}^{\dagger}e^{i\frac{\omega_p}{2}t}\right)^4 + 2\beta(t/T)\left(\hat{a}e^{-i\frac{\omega_p}{2}t} + \hat{a}^{\dagger}e^{i\frac{\omega_p}{2}t}\right)^2\cos\omega_p t \tag{5}$$

Here, e represents Napier's constant.

The initial value of the detuning Δ is set to a value less than 0. Here, the initial value is the value at the start of cat state generation processing, that is, after the elapsed time 0. The initial value of the detuning Δ is represented by $\Delta_I$. This is represented by $\Delta(0)=\Delta_I<0$.

The initial value of the detuning is also referred to as the initial detuning.

The final value of the detuning Δ is set to 0. Here, the final value is the value at the end of cat state generation processing, that is, after the elapsed time T. This is represented by Δ(1)=0.

The initial value of the pump intensity β is set to 0. This is represented by β(0)=0.

The final value of the pump intensity β is set to a value greater than 0. The final value of the pump intensity is represented by $\beta_F$. This is represented by $\beta(1)=\beta_F>0$. The final value $\beta_F$ of the pump intensity is determined according to, for example, the cat state to be generated. The computation device 10 may store the final value $\beta_F$ of the pump intensity in advance. Alternatively, a person such as the user may input the final value $\beta_F$ of the pump intensity to the computation device 10.

As a result of setting the initial detuning $\Delta_I$ to a value less than 0 and the initial value of the pump intensity β to 0, the quantum state of the Kerr-nonlinear parametric oscillator 100 is set to a vacuum state. From the vacuum state, the Kerr-nonlinear parametric oscillator 100 is oscillated by increasing the pump intensity β, and a cat state is generated.

In bra-ket notation, the vacuum state (in state vector representation) is represented by $|0_{vac}\rangle$. The cat state is represented by $|\psi_{cat}\rangle$. The cat state $|\psi_{cat}\rangle$ is represented by Equation (6).

(Equation 6)

$$|\psi_{cat}\rangle = \frac{|\alpha\rangle + |-\alpha\rangle}{\sqrt{2\left(1+e^{-2|\alpha|^2}\right)}} \tag{6}$$

The states $|\alpha\rangle$ and $|-\alpha\rangle$ represent two coherent states.

When the final value of the detuning Δ is 0, the final value of the pump intensity is $\beta_F$, the Kerr coefficient is χ, and the Kerr-nonlinear parametric oscillator 100 is used to generate the cat state, α is expressed by Equation (7).

(Equation 7)

$$\alpha = \sqrt{\frac{2\beta_F}{\chi}} \tag{7}$$

The plan generation unit 220 may calculate the value of the control parameters using a quadratic function in time t. For example, the plan generation unit 220 may calculate the value of the detuning Δ at the elapsed time t based on Equation (8).

(Equation 8)

$$\Delta^{(quad)}(t/T) = \Delta_I^{(quad)}\left[1 - a\left(\frac{t}{T}\right)^2 - (1-a)\frac{t}{T}\right] \tag{8}$$

"(quad)" denotes a case where a quadratic function is used. For example, $\Delta^{(quad)}$(t/T) represents the value of the detuning Δ at the elapsed time t when a quadratic function is used in the calculation of the detuning Δ. The term $\Delta_I^{(quad)}$ represents the initial detuning $\Delta_I$ when a quadratic function is used in the calculation of the detuning Δ. The initial detuning $\Delta_I$ is denoted as "$\Delta_I^{(quad)}$" to clarify that the initial detuning $\Delta_I$ may be different to cases such as those described below where functions of degree 3 or higher are used.

Here, a is an internal parameter included in the quadratic function $\Delta_I^{(quad)}[1-a(t/T)^2-(1-a)t/T]$ shown on the right hand side of Equation (8). $\Delta_I^{(quad)}$ also corresponds to an internal parameter included in the quadratic function.

The plan generation unit 220 may calculate the value of the pump intensity β at the elapsed time t based on Equation (9).

(Equation 9)

$$\beta^{(quad)}(t/T) = \beta_F\left[b\left(\frac{t}{T}\right)^2 + (1-b)\frac{t}{T}\right] \tag{9}$$

Here, b is an internal parameter included in the quadratic function shown on the right hand side of Equation (9).

As described above for the search for the internal parameter values, the generation of a plan by the plan generation unit 220 and the control of the Kerr-nonlinear parametric oscillator 100 by the control execution unit 230 may be repeated so as to search for the values of each of the internal parameters a and b and the initial detuning $\Delta_I^{(quad)}$ that allow the cat state (the ideal cat state described below) to be obtained, or to search for some of these values. Alternatively, instead of controlling the Kerr-nonlinear parametric oscillator 100, the control execution unit 230 may simulate the generation of a quantum state in the Kerr-nonlinear parametric oscillator 100, and search for each of the internal parameter values a and b and the initial detuning $\Delta_I^{(quad)}$ that allow the cat state to be obtained, or search for some of these values, based on a simulation result.

Figure 3:
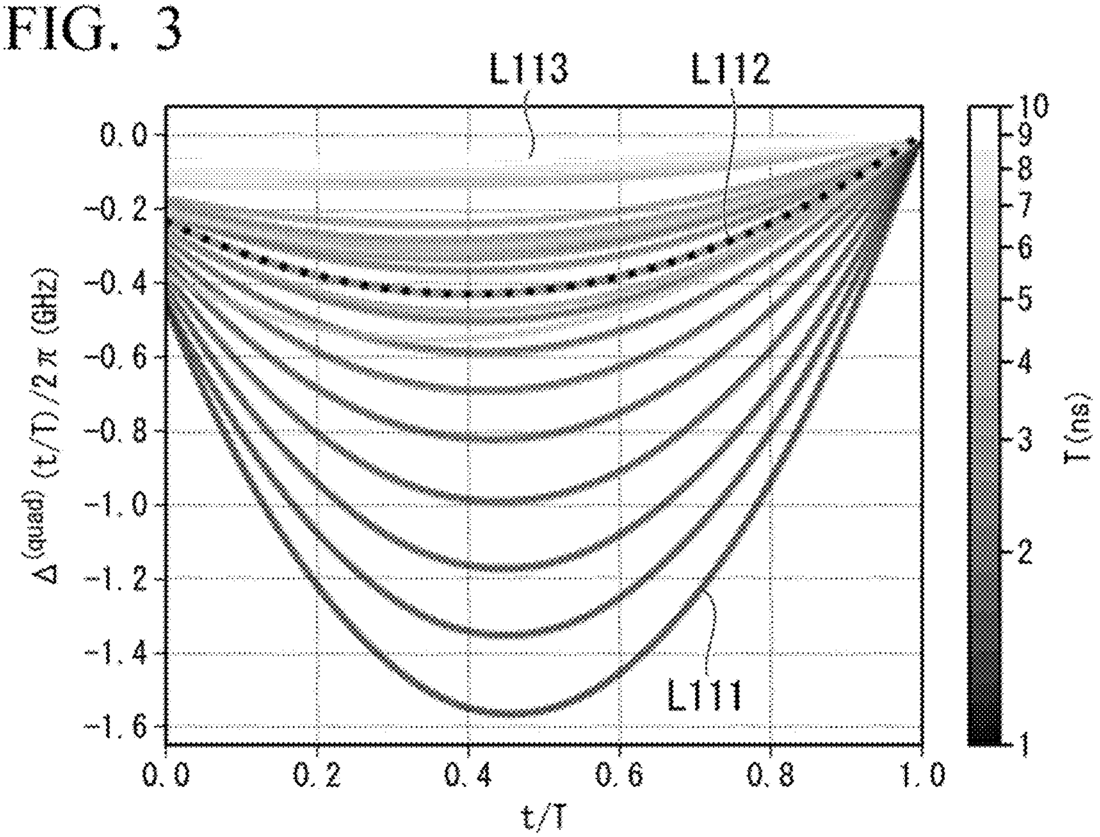
FIG. 3 is a diagram showing an example where a plan generation unit according to some example embodiments calculates a detuning using a quadratic function.

FIG. 3 is a diagram showing an example where the plan generation unit 220 calculates the detuning Δ using a quadratic function. FIG. 3 shows the calculated values of the detuning Δ obtained in a numerical experiment in a graph.

The horizontal axis of the graph in FIG. 3 represents the ratio t/T of the elapsed time t to the generation time T of the cat state. The vertical axis represents the value of the detuning $\Delta^{(quad)}$(t/T) divided by 2π expressed in units of gigahertz (GHz). The symbol π represents the circle ratio.

In the numerical experiment, the generation time T of the cat state was set to various values, and then a search for a solution was performed as described above that optimizes the values of each of the internal parameters a and b and the initial detuning $\Delta_I^{(quad)}$ for each generation time T. FIG. 3 shows the relationship between t/T and $\Delta^{(quad)}$(t/T)/2π obtained by setting the values of the internal parameters a and b and the initial detuning $\Delta_I^{(quad)}$ in Equation (8) for each generation time T.

The lines obtained when the generation time T is relatively short are shown on the lower side of the graph. The lines obtained when the generation time is relatively long are shown on the upper side of the graph. For example, the line L111 represents the relationship between t/T and $\Delta^{(quad)}$(t/T)/2π when the generation time T is approximately 1 nanosecond (ns). The line L113 represents the relationship between t/T and $\Delta^{(quad)}$(t/T)/2π when the generation time T is approximately 10 nanoseconds. Furthermore, the line L112 represents the relationship between t/T and $\Delta^{(quad)}$(t/T)/2π when the generation time T is approximately 2 nanoseconds.

Figure 4:
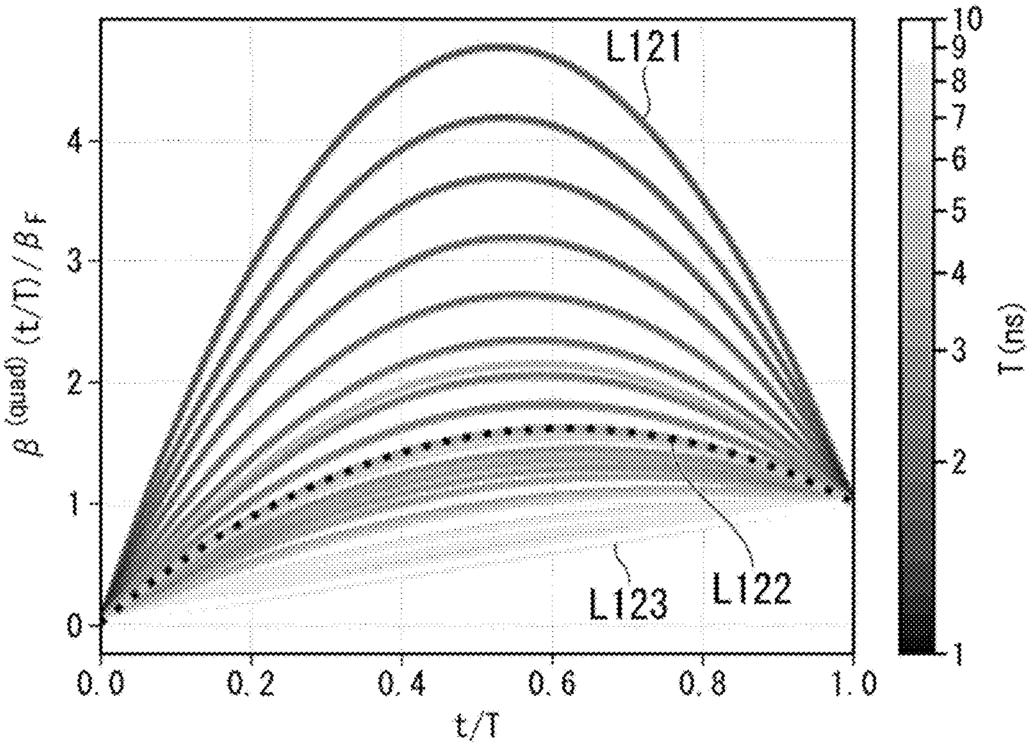
FIG. 4 is a diagram showing an example where a plan generation unit according to some example embodiments calculates a pump intensity using a quadratic function.

FIG. 4 is a diagram showing an example where the plan generation unit 220 calculates the pump intensity using a quadratic function. FIG. 4 shows the calculated values of the pump intensity obtained in a numerical experiment in a graph.

The horizontal axis of the graph in FIG. 4 represents the ratio t/T of the elapsed time t to the generation time T of the cat state. The vertical axis represents the value obtained when the pump intensity $\beta^{(quad)}$(t/T) is divided by the final value $\beta_F$ of the pump intensity.

FIG. 4 shows the relationship between t/T and $\beta^{(quad)}(t/T)/\beta_F$ obtained by setting the value of the internal parameter b obtained in the optimization in Equation (9) for each generation time T set in the numerical experiment.

The lines obtained when the generation time T is relatively short are shown on the upper side of the graph. The lines obtained when the generation time is relatively long are shown on the lower side of the graph. For example, the line L121 represents the relationship between t/T and $\beta^{(quad)}(t/T)/\beta_F$ when the generation time T is approximately 1 nanosecond (ns). The line L123 represents the relationship between t/T and $\beta^{(quad)}(t/T)/\beta_F$ when the generation time T is approximately 10 nanoseconds. Furthermore, the line L122 represents the relationship between t/T and $\beta^{(quad)}(t/T)/\beta_F$ when the generation time T is approximately 2 nanoseconds.

Figure 5:
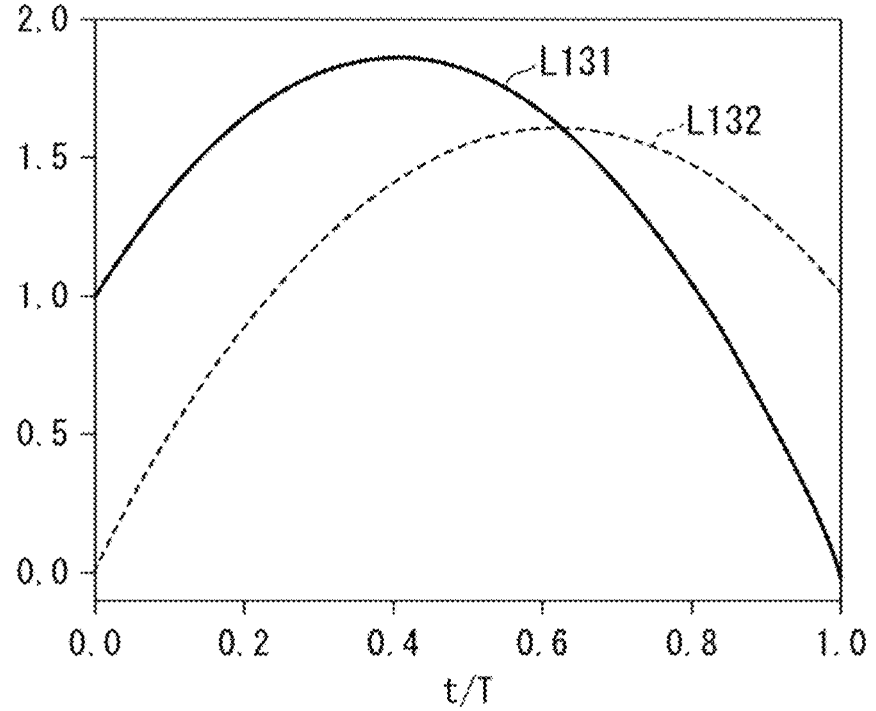
FIG. 5 is a diagram showing, in some example embodiments, an example of a detuning calculated by a plan generation unit using a quadratic function in a case where the generation time is approximately 2 nanoseconds.

FIG. 5 is a diagram showing an example where the plan generation unit 220 calculates the detuning using a quadratic function in a case where the generation time T is approximately 2 nanoseconds.

The horizontal axis of the graph in FIG. 5 represents the ratio t/T of the elapsed time t to the generation time T of the cat state. The line L131 represents the relationship between t/T and $\Delta^{(quad)}(t/T)/\Delta_I^{(quad)}$. For the line L131, the vertical axis of the graph in FIG. 5 represents the value obtained when the detuning $\Delta^{(quad)}(t/T)$ is divided by the initial detuning $\Delta_I^{(quad)}$. Because $\Delta_I^{(quad)}<0$, the graph in FIG. 3 shows downwardly convex lines, while the line L131 in FIG. 5 is upwardly convex.

The line L132 represents the relationship between t/T and $\beta^{(quad)}(t/T)/\beta^F$. For the line L132, the vertical axis of the graph in FIG. 5 represents the value obtained when the pump intensity $\beta^{(quad)}(t/T)$ is divided by the final value $\beta_F$ of the pump intensity.

Figure 6:
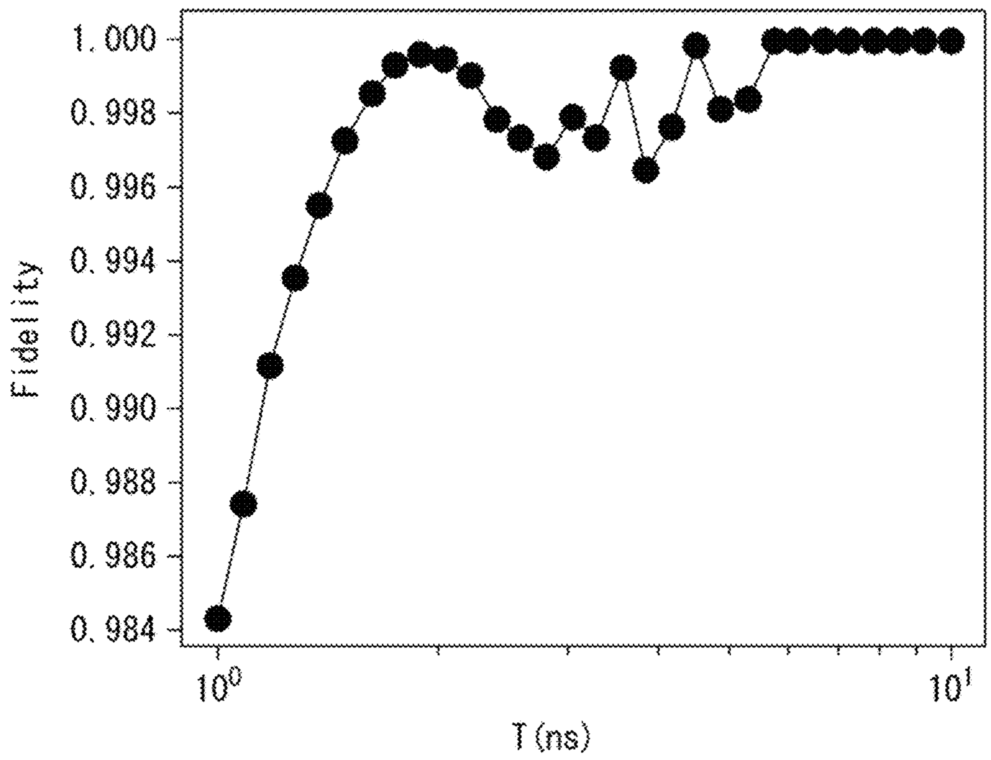
FIG. 6 is a diagram showing an example of the fidelity of the quantum states obtained by a computation device according to some example embodiments.

FIG. 6 is a diagram showing an example of the fidelity of the quantum states obtained by the computation device 10. FIG. 6 shows the fidelity of the quantum state obtained for each generation time T set in the numerical experiment. The fidelity is an index that represents the degree of similarity between two quantum states with a value in the range [0,1]. Here, the fidelity between the quantum state obtained in the generation processing of the cat state and the quantum state determined as an ideal cat state is used. The fidelity F in this case can be expressed by Equation (10).

(Equation 10)

$$F = |\langle\psi|\psi_{cat}\rangle|^2 \quad (10)$$

$\langle\psi|$ represents the quantum state obtained in the generation processing of the cat state.

Furthermore, in Equation (10), $|\psi_{cat}\rangle$ represents the ideal cat state. The state is referred to as "ideal" because, even among the cat states that satisfy Equation (6), the quantum state differs depending on the value of $\alpha$. When a cat state that satisfies Equation (6) is used as the initial state of a quantum bit in quantum annealing and the like, it is preferable that the value of $e^{-2|\alpha|2}$ is small. Therefore, it is preferable that the value of a is large. On the other hand, for example, when using the Hamiltonian $\hat{H}_{KPO}$ represented by Equation (4), the cat state becomes more difficult to generate when the value of $\alpha$ is too large. It is assumed that the ideal cat state is defined as the cat state when the value of $\alpha$ is appropriate based on the above.

The horizontal axis of the graph in FIG. 6 represents the generation time T of the cat state in units of nanoseconds. The vertical axis represents the fidelity.

In the graph of FIG. 6, the fidelity of the quantum state obtained in the numerical experiment is plotted for a section in which the generation time T of the cat state is from 1 nanosecond to 10 nanoseconds. In the section in which the generation time T of the cat state is from 1 nanosecond to 10 nanoseconds, the fidelity has a high value of 0.984 or more. In particular, when the generation time T of the cat state is approximately 2 nanoseconds, the fidelity momentarily reaches a maximum and has a value of approximately 1. In the section in which the generation time T of the cat state is from 2 nanoseconds to 10 nanoseconds, the fidelity is 0.996 or more. In particular, in the section in which the generation time T of the cat state is from 6 nanoseconds to 10 nanoseconds, the fidelity is approximately 1.

Figure 7:
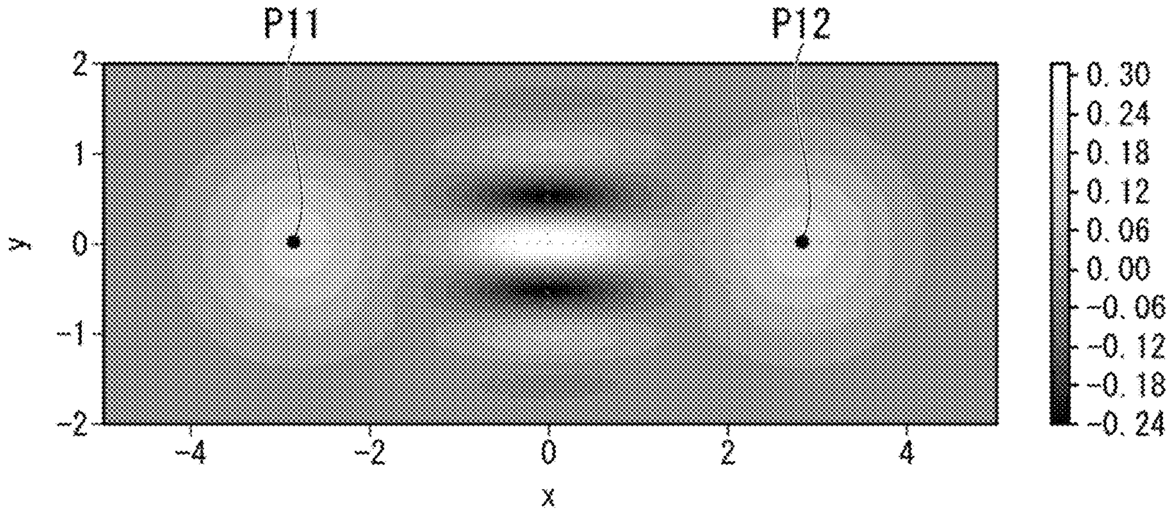
FIG. 7 is a diagram showing an example of a Wigner distribution in the case of an ideal cat state.

FIG. 7 is a diagram showing an example of a Wigner distribution in the case of an ideal cat state. The Wigner distribution represents the distribution of values of the Wigner function, and can be used to represent a quantum state. In the example of FIG. 7, the values of the Wigner function are shown in grayscale.

In the example of FIG. 7, the distribution values are maximized near the point P11 and near the point P12, respectively. Further, a distribution that approximately forms concentric contour lines centered at the respective maximum points is observed. In this way, a Wigner distribution in which two concentric distribution contour lines are formed corresponds to an example of a Wigner distribution of the cat state. Furthermore, the distribution is not limited to a distribution in which the two maximum points are each located on the x axis as in FIG. 7. A distribution in which such a distribution is rotated about the origin also corresponds to an example of a Wigner distribution of the cat state.

Moreover, the distance between the two maximum points near the point P11 and near the point P12 is proportional to a in Equation (6) and Equation (7). A quantum state with a larger distance is preferable as the initial state of the quantum bit. On the other hand, as mentioned above, there is an upper limit to the magnitude of a that can generate the cat state. Therefore, there is also an upper limit to the magnitude of the distance between two maximum points in the Wigner distribution of the cat state.

Figure 8:
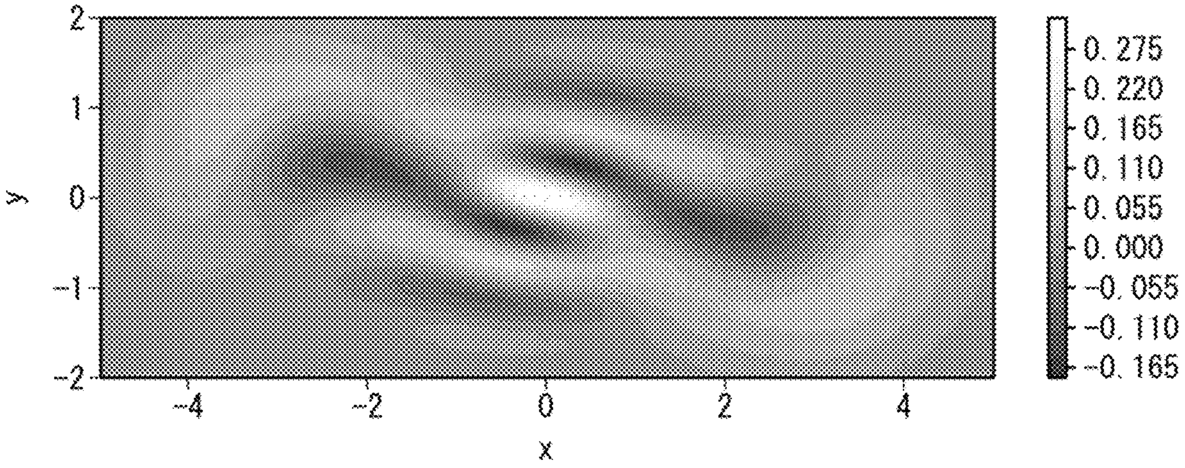
FIG. 8 is a diagram showing an example of a Wigner distribution in a case where generation of a cat state has failed.

FIG. 8 is a diagram showing an example of a Wigner distribution in a case where generation of a cat state has failed. Unlike the case of FIG. 7, in the example of FIG. 8, a distribution forming concentric contour lines is not observed. As a quantum state used as the initial state of the quantum bit, the quantum state in the example of FIG. 7 is preferable to the quantum state in the example of FIG. 8.

In the numerical experiment, as a comparison target for a case where the plan generation unit 220 uses a quadratic function to calculate the control parameter values, the quantum state is also obtained by a simulation and the fidelity is calculated for a case where the control parameter values are linearly changed according to time. The value of the detuning $\Delta$ in this case is represented by Equation (11).

(Equation 11)

$$\Delta^{(lin)}(t/T) = \Delta_I^{(lin)} \times (1 - t/T) \quad (11)$$

"(lin)" denotes a case where a linear function is used. For example, $\Delta^{(lin)}$(t/T) represents the value of the detuning Δ at the elapsed time t when a linear function is used in the calculation of the detuning Δ. The term $\Delta_I^{(lin)}$ represents the initial detuning $\Delta_I$ when a linear function is used in the calculation of the detuning Δ.

"x" represents multiplication. "(1−t/T)" on the right side does not represent the argument of "$\Delta_I^{(lin)}$". The symbol "x" is shown to make it clear that "$\Delta_I$(lin)" and "(1−t/T)" are multiplied together.

Equation (11) corresponds to Equation (8) when the value of the internal parameter a is set to 0.

Furthermore, the value of the pump intensity β is represented by Equation (12).

(Equation 12)

$$\beta^{(lin)}(t/T) = \beta_F \times (t/T) \tag{12}$$

Equation (12) corresponds to Equation (9) when the value of the internal parameter b is set to 0.

When using a linear function, the initial detuning $\Delta_I$ was used as the optimization target (search target).

Figure 9:
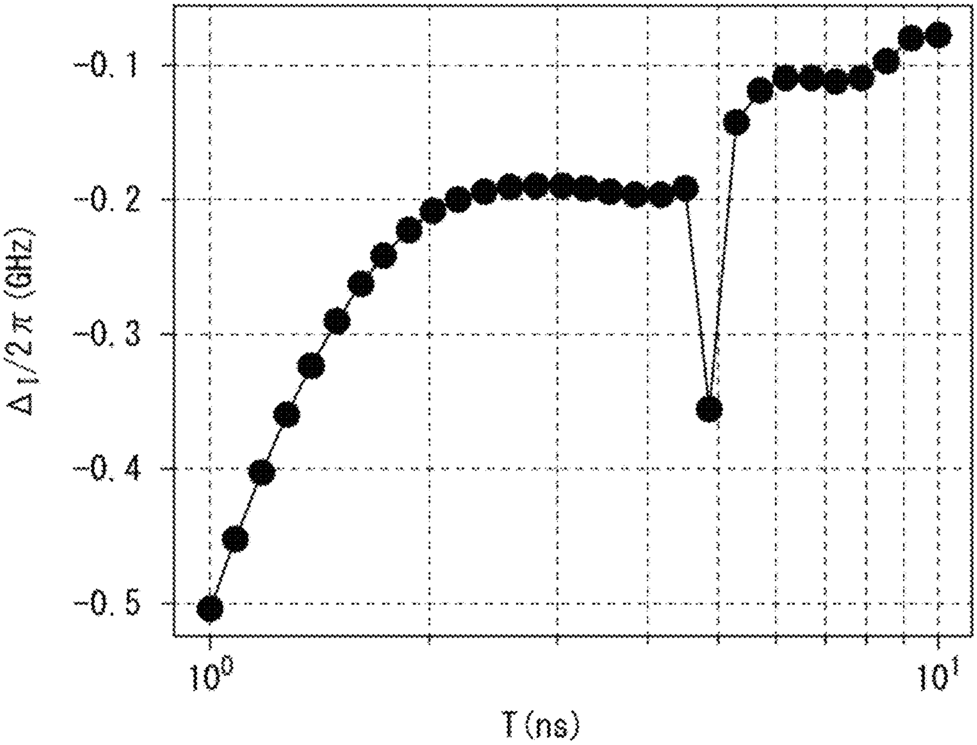
FIG. 9 is a diagram showing an example of an initial detuning in a case where the control parameter values are linearly changed according to time.

FIG. 9 is a diagram showing an example of the initial detuning $\Delta_I$ when the control parameter values are linearly changed according to time. The horizontal axis of the graph in FIG. 9 represents the generation time T of the cat state in units of nanoseconds. The vertical axis represents the value of the initial detuning $\Delta_I$ divided by 2π expressed in units of gigahertz (GHz).

FIG. 9 shows the initial detuning $\Delta_I$ obtained in the optimization described above for each generation time T of the cat state.

Figure 10:
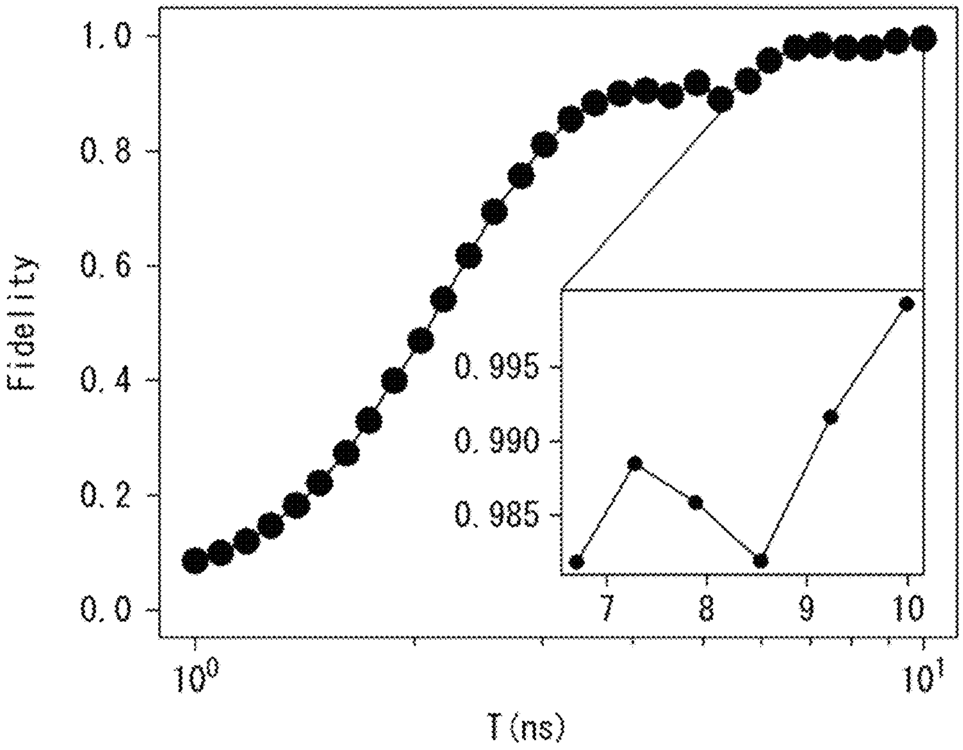
FIG. 10 is a diagram showing an example of the fidelity of a quantum state obtained by linearly changing the control parameter values according to time.

FIG. 10 is a diagram showing an example of the fidelity of a quantum state obtained by linearly changing the control parameter values according to time. The horizontal axis of the graph in FIG. 10 represents the generation time T of the cat state in units of nanoseconds. The vertical axis represents the fidelity.

Comparing the example of FIG. 6 and the example of FIG. 10, the example of FIG. 6 can be evaluated as having a higher fidelity, particularly in the section in which the generation time T of the cat state is relatively short. For example, in the example of FIG. 6, the fidelity is 0.984 or more in the section in which the generation time T of the cat state is from 1 nanosecond to 10 nanoseconds. In contrast, in the example of FIG. 10, the fidelity is approximately 0.1 when the generation time T of the cat state is 1 nanosecond. Furthermore, in the example of FIG. 10, the fidelity only reaches 0.984 when the generation time T of the cat state is approximately 7 nanoseconds.

In this way, calculation of the value of the detuning Δ and the value of the pump intensity β using a quadratic function can be evaluated as more easily allowing the ideal cat state, or a quantum state close to the cat state, to be obtained in a shorter time compared to a case where the calculation is performed using a linear function. When the value of the detuning Δ and the value of the pump intensity β are calculated using a quadratic function, the ideal cat state can be considered to be more easily obtained as described below.

At the start of generation processing of the cat state, by setting the initial detuning $\Delta_I$ to an appropriate value, it is possible to widen the band width between energy levels. As a result, it is possible to suppress a transition to an undesired quantum state. On the other hand, when the magnitude of the initial detuning $\Delta_I$ is too large, it becomes difficult to change the quantum state from the vacuum state, which is the initial state. Therefore, the computation device 10 sets the value of the initial detuning $\Delta_I$ to a magnitude that is not too large, and not too small. The plan generation unit 220 may search for the initial detuning $\Delta_I$. Alternatively, the user may determine the initial detuning $\Delta_I$ and input it to the computation device 10.

Then, the computation device 10 changes the quantum state by gradually increasing the value of the pump intensity β. At this time, a transition to an undesired quantum state can be considered more likely to occur, particularly near the timing at which the cat state (a superposition state of two coherent states) begins to form. In particular, when the generation time T of the cat state is relatively short, the transition of the quantum state becomes a non-adiabatic transition. In this respect, a transition to an undesired quantum state can be considered more likely to occur. An undesired quantum state here is a quantum state in which the ideal cat state cannot be reached in subsequent state transitions, or a quantum state in which it is difficult to reach the ideal cat state.

Therefore, the computation device 10 increases the value of the pump intensity β and also increases the magnitude of the detuning Δ, which makes it difficult for the quantum state to transition to an undesired quantum state.

If the magnitude of detuning Δ remains large after the timing at which a transition to an undesired quantum state is likely has passed, it is conceivable that a transition of the quantum state does not proceed and a transition to the ideal cat state does not occur. Therefore, the computation device 10 decreases the magnitude of the detuning Δ, and finally sets the value of the detuning to 0. On the other hand, the computation device 10 finally sets the pump intensity β to a value greater than 0 to promote a transition of the quantum state.

For example, after the timing at which a transition to an undesired quantum state is likely to occur has passed, the computation device 10 may start to reduce the magnitude of the detuning Δ and temporarily increase the pump intensity to promote a change in the quantum state. It is expected that the desired quantum state (ideal cat state) can be obtained as a result of the computation device 10 promoting a change in the quantum state after the timing at which a transition to an undesired quantum state is likely to occur has passed.

FIG. 5 shows an example in which the computation device 10 first starts to reduce the magnitude of the detuning Δ and then starts to reduce the pump intensity β. In the example of FIG. 5, the computation device 10 changes the magnitude of the detuning Δ represented by the line L131 from increasing to decreasing after the elapsed time is approximately t/T=0.4. Then, the computation device 10 changes the magnitude of the pump intensity β represented by the line L132 from increasing to decreasing shortly after t/T=0.6.

In this way, by going through the process of increasing and then decreasing the magnitude of the detuning Δ and the pump intensity β, it is possible to approximately maintain a maximum energy state under an ever-changing Hamiltonian. Therefore, it is expected that the ideal cat state, or a state close to the ideal cat state, can be obtained. In particular, even if the generation time T of the cat state is relatively short and a non-adiabatic transition is likely to occur, it is expected that the ideal cat state, or a state close to the ideal cat state, can be obtained.

Note that it is also possible to invert the magnitude relationship of the values of the Hamiltonian, for example, by adding a negative sign to the Hamiltonian $\hat{H}_{RWA}$ shown in Equation (2). In this case, the processing described above performed by the computation device 10 can be understood as approximately maintaining a minimum energy state.

A result has been obtained in the numerical experiment where, upon shortening the generation time T of the cat state, the magnitude of the detuning Δ increases exponentially in the optimal solution of the obtained schedule with respect to the reduced time of the generation time T of the cat state. For example, in FIG. 3, the minimum value (peak value) of the detuning Δ does not decrease much near the line L113, where the cat state generation time T is relatively long, even when the generation time T of the cat state decreases. On the other hand, the minimum value of the detuning Δ significantly decreases with respect to a decrease in the generation time T of the cat state near the line L111, where the cat state generation time T is relatively short.

This is thought to be because shortening the generation time T of the cat state exponentially increases the ease of transition to an undesired quantum state.

A result has been obtained in the numerical experiments in which the maximum value of the pump intensity β increases exponentially with respect to the reduced time of the generation time T of the cat state. For example, in FIG. 4, the maximum value of the pump intensity β does not increase much near the line L123, where the cat state generation time T is relatively long, even when the generation time T of the cat state decreases. On the other hand, the maximum value of the pump intensity 3 significantly increases with respect to a decrease in the generation time T of the cat state near the line L121, where the cat state generation time T is relatively short.

In this way, when the value of the detuning Δ and the value of the pump intensity 3 are calculated using a quadratic function, there is an advantage in terms of the processing time and an advantage in terms of the computation accuracy in that the ideal cat state, or a quantum state close to the ideal cat state, can be obtained in a relatively short time.

As an advantage in terms of the processing time, the overall processing time, which is the sum of the generation time of the cat state and the quantum computing time using the cat state as the initial values of the variables, can be shortened. Alternatively, if there is an upper limit on the overall processing time, such as a constraint on the coherence time, the shorter generation time of the cat state allows more time to be allocated to quantum computing using the cat state as the initial values of the variables.

As an advantage in terms of the computation accuracy, because the generation time of the cat state is short, the effect of noise on the generated cat state is small, and in this respect, it is possible to obtain a quantum state that is closer to the ideal cat state. As a result of performing quantum computing using a quantum state close to the ideal cat state as the initial values of the variables, it is expected that the accuracy of the solution obtained by quantum computing will be high.

In the numerical experiment, a quantum state was obtained by a simulation and the fidelity was calculated for a case where the plan generation unit 220 calculated the detuning Δ and the pump intensity 3 using functions of degree 3 and higher. Specifically, the function $\Delta^{(d\Delta)}$(t/T) shown in Equation (13) was set as the function for the plan generation unit 220 to calculate the detuning Δ.

(Equation 13)

$$\Delta^{(d\Delta)}(t/T) = \Delta_f^{(d\Delta)}\left[1 - \sum_{i=2}^{d\Delta} a_i\left(\frac{t}{T}\right)^i - \left(1 - \sum_{i=2}^{d\Delta} a_i\right)\frac{t}{T}\right] \tag{13}$$

dΔ is an integer representing the degree on the right side of Equation (13), and dΔ≥2. When dΔ=2, Equation (13) becomes the same equation as Equation (8).

"(dΔ)" denotes a case where a function of degree dΔ is used.

Furthermore, the function $\beta^{(d\Delta)}$(t/T) shown in Equation (14) was set as the function for the plan generation unit 220 to calculate the pump intensity β.

(Equation 14)

$$\beta^{(d\beta)}(t/T) = \beta_f\left[\sum_{i=2}^{d\beta} b_i\left(\frac{t}{T}\right)^i + \left(1 - \sum_{i=2}^{d\beta} b_i\right)\frac{t}{T}\right] \tag{14}$$

dβ is an integer representing the degree on the right side of Equation (14), and dβ≥2. When dβ=2, Equation (14) becomes the same equation as Equation (9). The value of dβ and the value of dΔ may be the same or different.

"(dβ)" denotes a case where a function of degree dβ is used.

Figure 11:
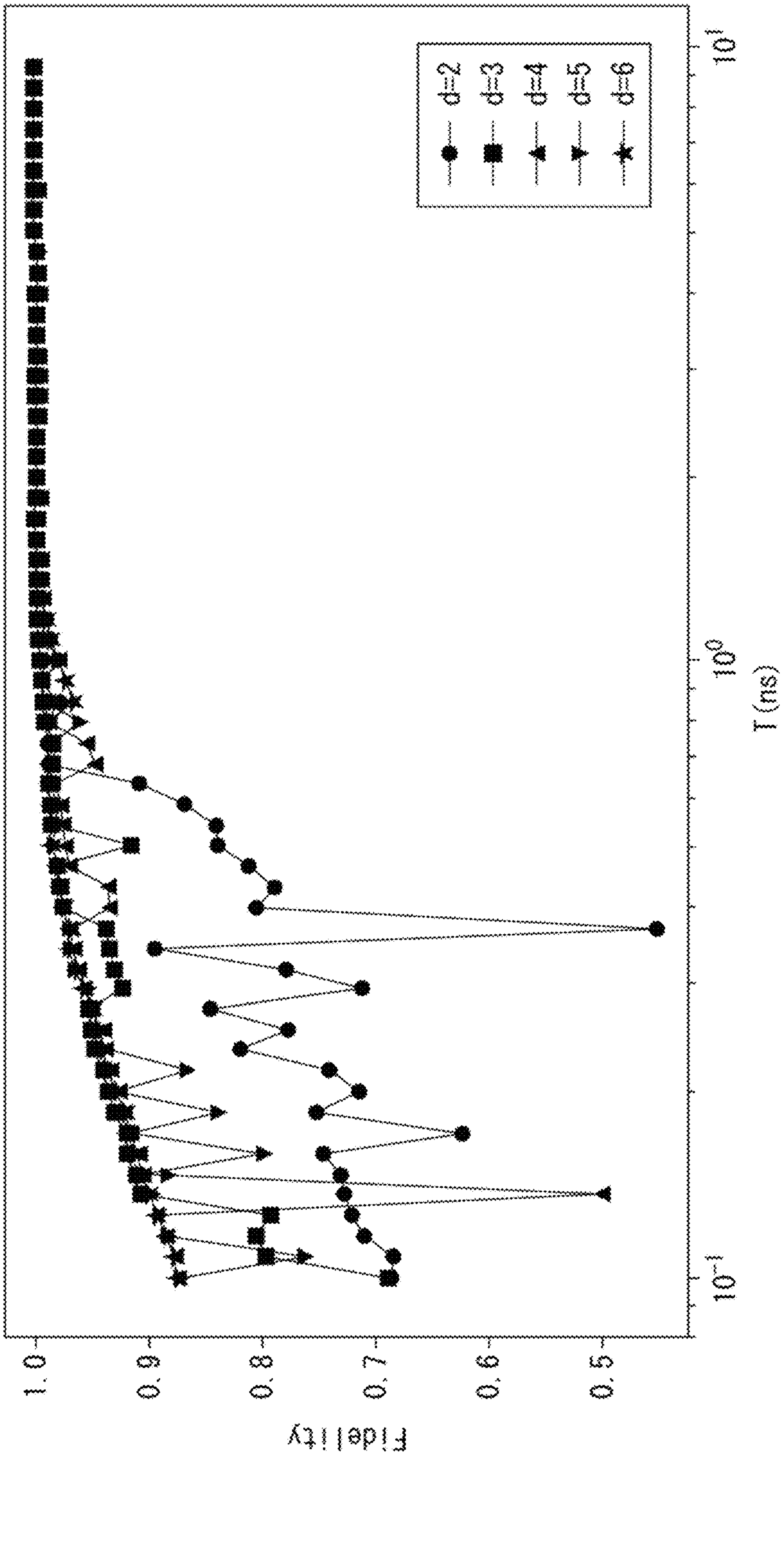
FIG. 11 is a diagram showing an example of the fidelity in some example embodiments when functions of degree 2 or higher are used.

FIG. 11 is a diagram showing an example of the fidelity when functions of degree 2 or higher are used. The horizontal axis of the graph in FIG. 11 represents the generation time T of the cat state in units of nanoseconds. The vertical axis represents the fidelity.

In the numerical experiment, Equation (13) and Equation (14) were each set to functions of degrees 2 to 6, and the fidelity was calculated by generating the quantum state in a simulation. FIG. 11 shows the fidelity calculated as a result of the numerical experiment.

Note that, in the numerical experiment, Equation (13) and Equation (14) are set to the same degree. That is to say, the value of dβ and the value of dΔ are set to the same value. Furthermore, in the numerical experiment, a solution search that optimizes the internal parameters $a_i$ and $b_i$, and the initial detuning $\Delta_f^{(d\Delta)}$ was performed for each generation time T.

"d" in the legend indicates the degree of the polynomial. The plot of black circles (•) represents the fidelity for each generation time T of the cat state when a quadratic function is used. The plot of squares (■) represents the fidelity for each generation time T of the cat state when a function of degree 3 is used. The plot of upward triangles (▲) represents the fidelity for each generation time T of the cat state when a function of degree 4 is used. The plot of downward triangles (▼) represents the fidelity for each generation time T of the cat state when a function of degree 5 is used. The plot of star symbols (★) represents the fidelity for each generation time T of the cat state when a function of degree 6 is used.

In the result of the numerical experiment shown in FIG. 11, in the section in which the generation time T of the cat state is from 1 nanosecond to 10 nanoseconds, the fidelity is approximately 1 when using any of the functions of degrees 2 to 6. This can be evaluated as a good result compared to, for example, a case where a linear function is used as shown in FIG. 10. From this, it is expected that the cat state can be generated in a shorter time by using a function of degree 2 or higher than when using a linear function.

Furthermore, in the section in which the generation time T of the cat state is from 0.1 nanoseconds to 1 nanoseconds, as a general tendency, it can be recognized that the fidelity is higher when using functions of degree 3 or higher than when using a quadratic function.

Based on this, by using a function of degree 3 or higher, it is expected that the ideal cat state can be obtained with an even shorter cat state generation time T than in a case where a quadratic function is used.

The plan of the detuning $\Delta$ and the pump intensity $\beta$ used by the computation device 10 is not limited to a plan where the values take smooth and continuous values with respect to the elapsed time t. Various plans are possible in which the magnitude of the detuning $\Delta$ and the value of the pump intensity $\beta$ initially increase and then decrease.

For example, the plan generation unit 220 may generate, as a plan of the detuning $\Delta$ and the pump intensity $\beta$, or as a plan of either one of these, a plan which is not smooth with respect to the elapsed time t such as a plan which is represented by a triangular function with respect to the elapsed time t.

Alternatively, the plan generation unit 220 may generate, as a plan of the detuning $\Delta$ and the pump intensity $\beta$, or as a plan of either one of these, a plan which is discontinuous with respect to the elapsed time t such as a plan which is represented by a step function (or staircase function) with respect to the elapsed time t.

Figure 12:
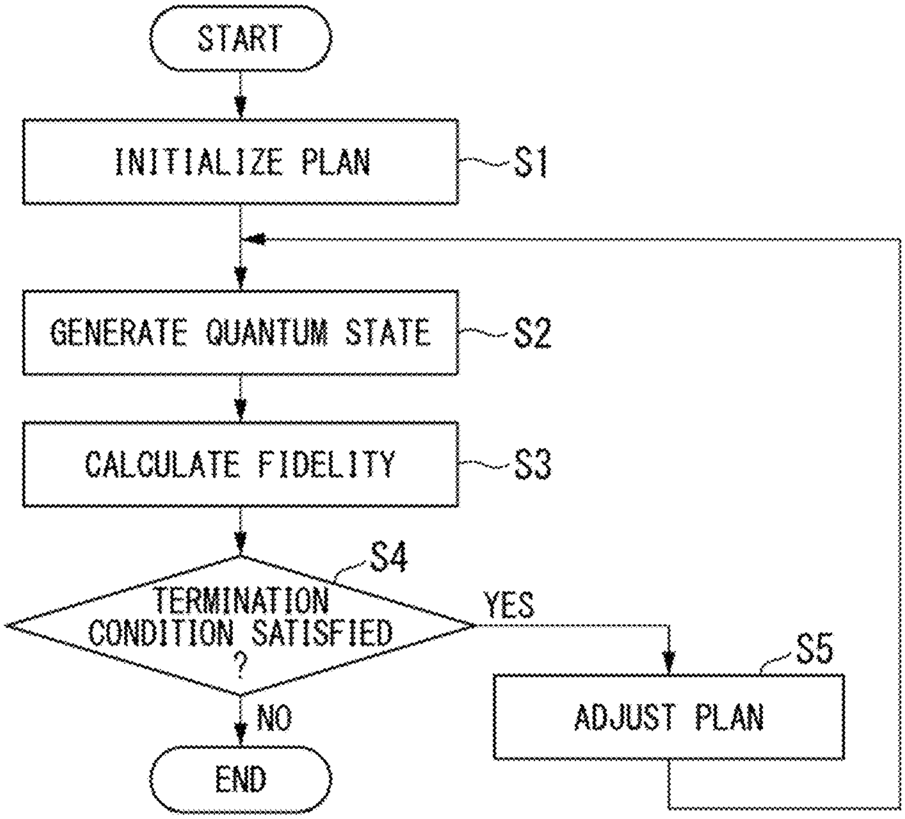
FIG. 12 is a diagram showing an example of a procedure by which a computation device according to some example embodiments generates a cat state.

FIG. 12 is a diagram showing an example of a procedure by which the computation device 10 generates the cat state. The computation device 10 performs the processing in FIG. 12 with respect to each of the plurality of Kerr-nonlinear parametric oscillators 100. Alternatively, when the characteristics of the plurality of Kerr-nonlinear parametric oscillators 100 are all the same, the computation device 10 may perform the processing of FIG. 12 with respect to one Kerr-nonlinear parametric oscillator 100 to complete the control plan of the Kerr-nonlinear parametric oscillators 100. Then, the computation device 10 may generate the cat state in all of the Kerr-nonlinear parametric oscillators 100 based on the completed plan.

(Step S1)

In the processing of FIG. 12, the plan generation unit 220 initializes the plan that controls the Kerr-nonlinear parametric oscillator 100.

For example, the plan generation unit 220 sets predetermined initial values for the initial detuning $\Delta_I^{(d\Delta)}$ and each of the internal parameters $a_i$ ($i=2, \ldots, d\Delta$) in Equation (13). As a result, the plan generation unit 220 initializes a plan of the value of the detuning $\Delta(t/T)$ at each time. In addition, the plan generation unit 220 sets the final value $\beta_F$ of the pump intensity $\beta$ in Equation (14) to a value specified by the user according to the ideal cat state, and sets predetermined initial values for each of the internal parameters $b_i$ ($i=2, \ldots, d\beta$). As a result, the plan generation unit 220 initializes a plan of the value of the pump intensity $\beta(t/T)$ at each time.

However, the method by which the plan generation unit 220 sets the initial values of the internal parameters of the function is not limited to a specific method. For example, the plan generation unit 220 may randomly set the initial values of some or all of the initial detuning $\Delta_I^{(d\Delta)}$, the internal parameters $a_i$, and the internal parameters $b_i$.

Further, in order to execute the obtained plan, the plan generation unit 220 calculates, as necessary, the value at each time of the control parameters whose values are subjected to direct setting in the control of the Kerr-nonlinear parametric oscillator 100. For example, in order to execute the generated plan of the detuning and the pump intensity, the plan generation unit 220 calculates the amplitude and frequency of the current to be input to the Kerr-nonlinear parametric oscillator 100 as the pump signal.

Alternatively, instead of the plan generation unit 220, the control execution unit 230 may convert the values represented by the plan into the values of the control parameters mentioned above when controlling the Kerr-nonlinear parametric oscillator 100 in step S2.

After step S1, the processing proceeds to step S2.

(Step S2)

The control execution unit 230 controls the Kerr-nonlinear parametric oscillator 100 according to the plan generated by the plan generation unit 220 to generate a quantum state. For example, the control execution unit 230 controls the Kerr-nonlinear parametric oscillator 100 by inputting to the Kerr-nonlinear parametric oscillator 100 a pump signal having the amplitude and frequency calculated by the plan generation unit 220 for each time.

Alternatively, the control execution unit 230 may calculate the quantum state by a simulation instead of controlling the Kerr-nonlinear parametric oscillator 100. As a result, the computation device 10 can complete the control plan without needing to actually control the Kerr-nonlinear parametric oscillator 100 in the planning stage.

After step S2, the processing proceeds to step S3.

(Step S3)

The control unit 200 calculates the fidelity of the quantum state obtained in step S2. Specifically, the control unit 200 calculates the fidelity based on Equation (10) described above.

After step S3, the processing proceeds to step S4.

(Step S4)

The control unit 200 determines whether or not a termination condition of the loop from steps S2 to S5 is satisfied. The termination condition here is not limited to a specific condition. For example, the termination condition may be set such that the loop from steps S2 to S5 is terminated when the fidelity is greater than or equal to a predetermined threshold. Alternatively, the termination condition may be set such that the loop from steps S2 to S5 is terminated when the loop has been repeatedly executed a predetermined number of times or more.

If the control unit 200 determines that the termination condition is satisfied (step S4: YES), the computation device 10 terminates the processing of FIG. 12.

On the other hand, if the control unit 200 determines that the termination condition is not satisfied (step S4: NO), the processing proceeds to step S5.

(Step S5)

The plan generation unit 220 adjusts the plan that controls the Kerr-nonlinear parametric oscillator 100.

For example, based on the value of the fidelity calculated in step S3, the plan generation unit 220 performs a solution search for the values of each of the initial detuning $\Delta_I^{(d\Delta)}$ and the internal parameters $a_i$ in Equation (13) and the values of each of the internal parameters $b_i$ in Equation (14), such that the value of the fidelity further increases.

The method by which the plan generation unit 220 performs the solution search is not limited to a specific method. For example, the plan generation unit 220 may search for a value of each of the initial detuning $\Delta_I^{(d\Delta)}$, the internal parameters $a_i$, and the internal parameters $b_i$ using a known optimization method such as the Powell method or the BFGS (Broyden-Fletcher-Goldfarb-Shanno) method.

The plan generation unit 220 updates the plan that controls the Kerr-nonlinear parametric oscillator 100 by setting the obtained values in Equation (13) and Equation (14).

In the loop from steps S2 to S5, the control unit 200 may search for the values of each of the initial detuning $\Delta_I^{(d\Delta)}$, the internal parameters $a_i$, and the internal parameters $b_i$ by solving an optimization problem that maximizes the value of the fidelity represented by Equation (10) above. Alternatively, the control unit 200 may search for the values of each of the initial detuning $\Delta_I^{(d\Delta)}$, the internal parameters $a_i$, and the internal parameters $b_i$ by solving an optimization problem that maximizes the expected energy value of the final Hamiltonian. When the quantum state generated by the computation device 10 is denoted by $|\psi>$, the final Hamiltonian H is expressed by Equation (15).

(Equation 15)

$$H = -\frac{\chi}{2}\hat{a}^{\dagger 2}\hat{a}^2 + \beta_F\left(\hat{a}^{\dagger 2} + \hat{a}^2\right) \tag{15}$$

The energy expected value E for the final Hamiltonian H is represented by Equation (16).

(Equation 16)

$$E = \langle\psi|H|\psi\rangle \tag{16}$$

Further, in the same manner as in step S1, in order to execute the obtained plan, the plan generation unit 220 calculates, as necessary, the values at each time of the control parameters whose values are subjected to direct setting in the control of the Kerr-nonlinear parametric oscillator 100. Alternatively, as mentioned above, instead of the plan generation unit 220, the control execution unit 230 may convert the values represented by the plan into the values of the control parameters whose values are subjected to direct setting when controlling the Kerr-nonlinear parametric oscillator 100 in step S2.

After step S5, the processing returns to step S2.

As described above, the plan generation unit 220 generates a plan that controls the Kerr-nonlinear parametric oscillator 100 such that an intensity of the pump signal β that is input to the Kerr-nonlinear parametric oscillator 100 increases from a first value (initial value of the pump intensity) according to the elapsed time and then decreases to a second value (final value $\beta_F$ of the pump intensity), and the magnitude of the detuning Δ between the resonance frequency and the oscillation frequency of the Kerr-nonlinear parametric oscillator 100 increases from a third value (magnitude of the initial detuning $\Delta_I$) according to the elapsed time and then decreases to a fourth value (magnitude of the final value of the detuning). The control execution unit 230 controls the Kerr-nonlinear parametric oscillator 100 based on the plan generated by the plan generation unit 220 to generate a quantum state. Furthermore, the control execution unit 230 performs computation using the obtained quantum state.

The computation device 10 changes the quantum state toward the cat state by increasing the intensity of the pump signal β according to the elapsed time. At this time, a transition to an undesired quantum state can be considered more likely to occur, particularly near the timing at which a cat state begins to form. In particular, when the generation time T of the cat state is relatively short, the transition of the quantum state becomes a non-adiabatic transition. In this respect, a transition to an undesired quantum state can be considered more likely to occur.

Therefore, the computation device 10 increases the value of the pump intensity β and also increases the magnitude of the detuning Δ, which makes it possible for a transition of the quantum state to an undesired quantum state to be made more difficult.

If the magnitude of detuning Δ remains large after the timing at which a transition to an undesired quantum state is likely to occur has passed, it is conceivable that a transition of the quantum state does not proceed and a transition to the ideal cat state does not occur. Therefore, the computation device 10 decreases the magnitude of the detuning Δ, and finally sets the value of the detuning to 0. On the other hand, the computation device 10 can finally set the pump intensity β to a value greater than 0 to promote a transition of the quantum state.

In the computation device 10, by going through such a process, it is possible to approximately maintain a maximum energy state under an ever-changing Hamiltonian. Therefore, it is expected that the ideal cat state, or a state close to the ideal cat state, can be obtained.

In particular, according to the computation device 10, when the cat state is generated using the Kerr-nonlinear parametric oscillator 100, the time required to generate the cat state can be made relatively short. For example, according to the computation device 10, the time required to generate the cat state can be made shorter than the time required to generate the cat state in a case where a linear function is used for the scheduling of the detuning Δ and the pump intensity β.

The Kerr-nonlinear parametric oscillator 100 corresponds to an example of an oscillator that performs parametric oscillation. The cat state corresponds to an example of a superposition state of a plurality of distinguishable quantum states.

Furthermore, the plan generation unit 220 generates a plan such that the pump intensity β shifts from increasing to decreasing after the magnitude of the detuning Δ shifts from increasing to decreasing.

According to the computation device 10, it is possible to provide a time period after the timing at which a transition to an undesired quantum state is likely to occur has passed, where the magnitude of the detuning Δ is small, and the pump intensity β is large. Therefore, it is possible to promote a transition of the quantum state toward the ideal cat state. In this respect, the computation device 10 is expected to obtain the ideal cat state, or a state close to the ideal cat state.

Moreover, the plan generation unit 220 acquires information representing the quantum state obtained when the Kerr-nonlinear parametric oscillator 100 is controlled based on the generated plan. Then, the plan generation unit 220 updates the plan based on the acquired information.

As a result, the plan generation unit 220 can update the plan that controls the Kerr-nonlinear parametric oscillator 100 using a solution search method such as an optimization method. In this respect, the computation device 10 is expected to obtain the ideal cat state, or a state close to the ideal cat state, even if a suitable control method of the Kerr-nonlinear parametric oscillator 100 is not known in advance.

In addition, the plan generation unit 220 uses the fidelity that represents an evaluation of a quantum state as an objective function to search for the values of the internal parameters included in a first function that represents the pump intensity β according to the elapsed time, and for the values of the internal parameters included in a second function that represents the magnitude of the detuning $\Delta$ according to the elapsed time, and updates the plan that controls the Kerr-nonlinear parametric oscillator 100.

Equation (9) corresponds to an example of the first function. In Equation (9), the internal parameter b corresponds to an example of the internal parameters included in the first function. Equation (14) also corresponds to an example of the first function. In Equation (14), the internal parameters $b_i$ correspond to examples of the internal parameters included in the first function. Furthermore, Equation (8) corresponds to an example of the second function. In Equation (8), the internal parameter a and the initial detuning $\Delta_I$ correspond to examples of the internal parameters included in the second function. Equation (13) also corresponds to an example of the second function. In Equation (13), the internal parameters $a_i$ and the initial detuning $\Delta_I^{(d\Delta)}$ correspond to examples of the internal parameters included in the second function.

According to the computation device 10, a plan can be generated by searching for the values of the internal parameters of the functions using a solution search method such as an optimization method. Here, generating a plan includes updating the plan.

Furthermore, according to the computation device 10, the plan is expressed in the form of functions, and by inputting the argument values into the functions, the value of the detuning $\Delta$ and the value of the pump intensity $\beta$ can be obtained, which enables the control of the Kerr-nonlinear parametric oscillator 100 to be executed. In this way, the computation device 10 has a relatively small load when executing the control of the Kerr-nonlinear parametric oscillator 100.

Furthermore, the first value (the initial value of the pump intensity) and the fourth value (the magnitude of the final value of the detuning) are both 0. The first function that represents the pump intensity $\beta$ according to the elapsed time, is a function obtained by multiplying the second value (final value $\beta_F$ of the pump intensity) and a polynomial in the elapsed time t having a value of 0 when starting the control of the Kerr-nonlinear parametric oscillator 100 for generating the cat state, and a value of 1 when ending the control of the Kerr-nonlinear parametric oscillator 100 for generating the cat state. The second function that represents the detuning $\Delta$ according to the elapsed time, is a function obtained by multiplying the third value (initial detuning $\Delta_I$) and a polynomial in the elapsed time t having a value of 1 when starting the control of the Kerr-nonlinear parametric oscillator 100 for generating the cat state, and a value of 0 when ending the control of the Kerr-nonlinear parametric oscillator 100 for generating the cat state.

According to the computation device 10, the value of the detuning $\Delta$ according to the elapsed time can be represented by relatively simple functions such as those exemplified in Equation (8) or Equation (13) above. Further, the value of the pump intensity $\beta$ according to the elapsed time can be represented by relatively simple functions such as those exemplified in Equation (9) or Equation (14) above.

Figure 13:
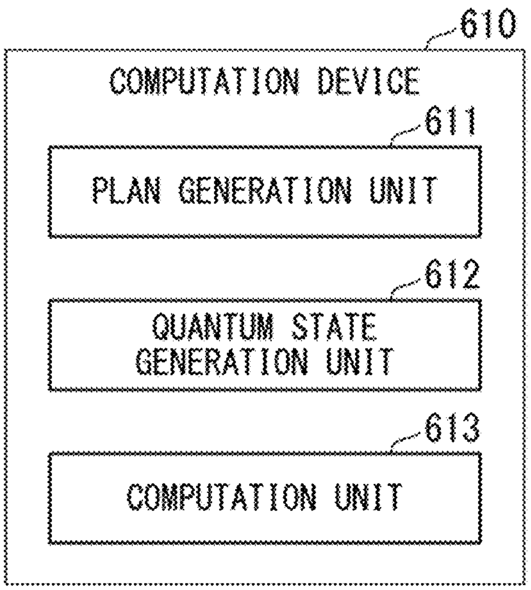
FIG. 13 is a diagram showing another example of a configuration of a computation device according to some example embodiments.

FIG. 13 is a diagram showing another example of a configuration of a computation device according to some example embodiments. In the configuration shown in FIG. 13, the computation device 610 includes a plan generation unit 611, a quantum state generation unit 612, and a computation unit 613.

In such a configuration, the plan generation unit 611 generates a plan that controls an oscillator that performs parametric oscillation such that an intensity of a pump signal that is input to the oscillator increases from a first value according to an elapsed time and then decreases to a second value, and a magnitude of a detuning between a resonance frequency and an oscillation frequency of the oscillator increases from a third value according to the elapsed time and then decreases to a fourth value. The quantum state generation unit 612 generates a quantum state by controlling the oscillator based on the plan. The computation unit 613 performs computation using the obtained quantum state.

The plan generation unit 611 corresponds to an example of the plan generation means. The quantum state generation unit 612 corresponds to an example of the quantum state generation means. The computation unit 613 corresponds to an example of a computation means.

The computation device 610 increases the intensity of the pump signal according to the elapsed time and promotes a transition of the quantum state of the oscillator, and is capable of suppressing a transition of the quantum state toward a state other than the ideal cat state by increasing the magnitude of the detuning. Then, the computation device 610 reduces the magnitude of the detuning, thereby making it possible to promote a transition of the quantum state after passing a quantum state representing the start of formation of a cat state that is considered to be a state in which a transition to a state other than the ideal cat state is more likely to occur. As a result, the computation device 610 is expected to obtain the ideal cat state, or a state close to the ideal cat state.

In particular, in the computation device 610, when generating a superposition state of a plurality of distinguishable quantum states using an oscillator that performs parametric oscillation, the time required to generate the superposition state can be made relatively short. That is to say, in the computation device 610, even when the generation time of the superposition state is relatively short and a non-adiabatic transition is likely to occur, it is expected that the ideal cat state, or a state close to the ideal cat state, can be obtained.

The plan generation unit 611 can be implemented using the functions of the plan generation unit 220 in FIG. 1 and the like. The quantum state generation unit 612 can be implemented using the functions of the control execution unit 230 in FIG. 1 and the like. The computation unit 613 can be implemented using the functions of the problem setting unit 210 and the control execution unit 230 in FIG. 1 and the like.

Figure 14:
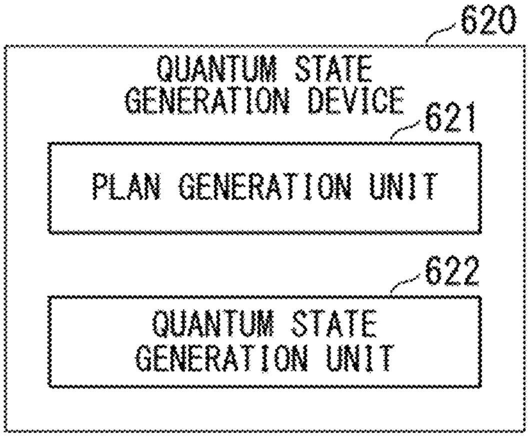
FIG. 14 is a diagram showing an example of a configuration of a quantum state generation device according to some example embodiments.

FIG. 14 is a diagram showing an example of a configuration of a quantum state generation device according to some example embodiments. In the configuration shown in FIG. 14, the quantum state generation device 620 includes a plan generation unit 621 and a quantum state generation unit 622.

In such a configuration, the plan generation unit 621 generates a plan that controls an oscillator that performs parametric oscillation such that an intensity of a pump signal that is input to the oscillator increases from a first value according to an elapsed time and then decreases, and a magnitude of a detuning between a resonance frequency and an oscillation frequency of the oscillator increases from a third value according to the elapsed time and then decreases to a fourth value. The quantum state generation unit 622 generates a quantum state by controlling the oscillator based on the plan.

The plan generation unit 621 corresponds to an example of the plan generation means. The quantum state generation unit 622 corresponds to an example of the quantum state generation means.

The quantum state generation device 620 increases the intensity of the pump signal according to the elapsed time and promotes a transition of the quantum state of the oscillator, and is capable of suppressing a transition of the quantum state toward a state other than the ideal cat state by increasing the magnitude of the detuning. Then, the quantum state generation device 620 reduces the magnitude of the detuning, and is thereby capable of promoting a transition of the quantum state after passing a quantum state representing the start of formation of a cat state that is considered to be a state in which a transition to a state other than the ideal cat state is more likely to occur. As a result, the quantum state generation device 620 is expected to obtain the ideal cat state, or a state close to the ideal cat state.

In particular, in the quantum state generation device 620, when generating a superposition state of a plurality of distinguishable quantum states using an oscillator that performs parametric oscillation, the time required to generate the superposition state can be made relatively short. That is to say, in the quantum state generation device 620, even when the generation time of the superposition state is relatively short and a non-adiabatic transition is likely to occur, it is expected that the ideal cat state, or a state close to the ideal cat state, can be obtained.

The plan generation unit 611 may be implemented using the functions of the plan generation unit 220 in FIG. 1 and the like. The quantum state generation unit 612 may be implemented using the functions of the control execution unit 230 in FIG. 1 and the like.

Figure 15:
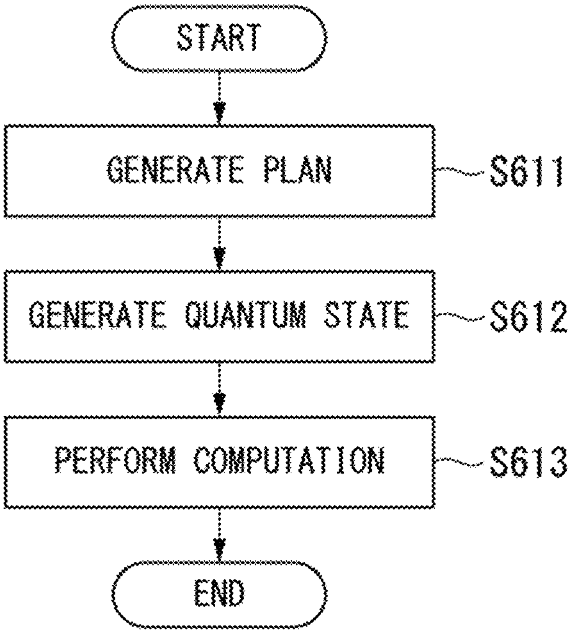
FIG. 15 is a diagram showing an example of the processing procedure of a computation method according to some example embodiments.

FIG. 15 is a diagram showing an example of the processing procedure of a computation method according to some example embodiments. The computation method shown in FIG. 15 includes generating a plan (step S611), generating a quantum state (step S612), and performing a computation (step S613).

The step for generating a plan (step S611) is for generating a plan that controls an oscillator that performs parametric oscillation such that an intensity of a pump signal that is input to the oscillator increases from a first value according to an elapsed time and then decrease to a second value, and a magnitude of detuning between a resonance frequency according to the elapsed time and an oscillation frequency of the oscillator increases from a third value and then decreases to a fourth value.

The step for generating a quantum state (step S612) is for generating a quantum state by controlling an oscillator based on the plan.

The step for performing a computation (step S613) is for performing computation using an obtained quantum state.

According to the computation method shown in FIG. 15, the intensity of the pump signal is increased according to the elapsed time and a transition of the quantum state of the oscillator is promoted, and it is possible to suppress a transition of the quantum state toward a state other than the ideal cat state by increasing the magnitude of the detuning. Then, in the computation method shown in FIG. 15, the magnitude of the detuning is reduced, which enables promotion of a transition of the quantum state after passing a quantum state representing the start of formation of a cat state that is considered to be a state in which a transition is more likely to occur to a state other than the ideal cat state. As a result, the computation method shown in FIG. 15 is expected to obtain the ideal cat state, or a state close to the ideal cat state.

In particular, in the computation method shown in FIG. 15, when generating a superposition state of a plurality of distinguishable quantum states using an oscillator that performs parametric oscillation, the time required to generate the superposition state can be made relatively short. That is to say, in the computation method shown in FIG. 15, even when the generation time of the superposition state is relatively short and a non-adiabatic transition is likely to occur, it is expected that the ideal cat state, or a state close to the ideal cat state, can be obtained.

Figure 16:
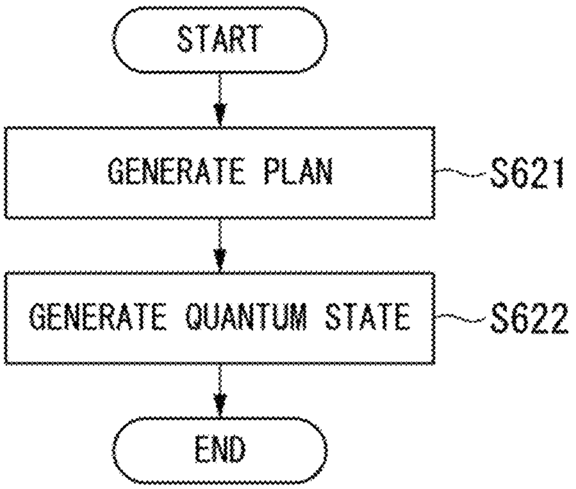
FIG. 16 is a diagram showing an example of the processing procedure of a quantum state generation method according to some example embodiments.

FIG. 16 is a diagram showing an example of a processing procedure of a quantum state generation method according to some example embodiments. The quantum state generation method shown in FIG. 16 includes generating a plan (step S621) and generating a quantum state (step S622).

The step for generating a plan (step S621) is for generating a plan that controls an oscillator that performs parametric oscillation such that an intensity of a pump signal that is input to the oscillator increases from a first value according to an elapsed time and then decrease to a second value, and a magnitude of detuning between a resonance frequency and an oscillation frequency of the oscillator increases from a third value according to the elapsed time and then decreases to a fourth value.

The step for generating a quantum state (step S622) is for generating a quantum state by controlling an oscillator based on the plan.

According to the quantum state generation method shown in FIG. 16, the intensity of the pump signal is increased according to the elapsed time and a transition of the quantum state of the oscillator is promoted, and it is possible to suppress a transition of the quantum state toward a state other than the ideal cat state by increasing the magnitude of the detuning. Then, in the quantum state generation method shown in FIG. 16, the magnitude of the detuning is reduced, which enables promotion of a transition of the quantum state after passing a quantum state representing the start of formation of a cat state that is considered to be a state in which a transition is more likely to occur to a state other than the ideal cat state. As a result, the quantum state generation method shown in FIG. 16 is expected to obtain the ideal cat state, or a state close to the ideal cat state.

In particular, in the quantum state generation method shown in FIG. 16, when generating a superposition state of a plurality of distinguishable quantum states using an oscillator that performs parametric oscillation, the time required to generate the superposition state can be made relatively short. That is to say, in the quantum state generation method shown in FIG. 16, even when the generation time of the superposition state is relatively short and a non-adiabatic transition is likely to occur, it is expected that the ideal cat state, or a state close to the ideal cat state, can be obtained.

Figure 17:
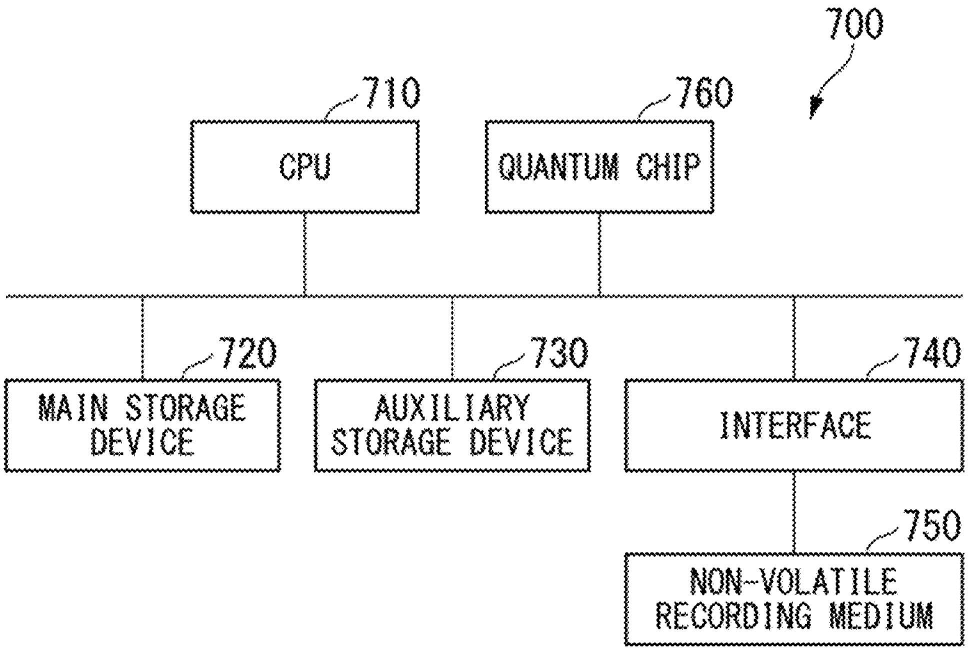
FIG. 17 is a diagram showing a configuration of a computer according to at least one example embodiment.

FIG. 17 is a diagram showing a configuration of a computer according to at least one example embodiment. In the configuration shown in FIG. 17, the computer 700 includes a CPU 710, a main storage device 720, an auxiliary storage device 730, an interface 740, a non-volatile recording medium 750, and a quantum chip 760.

Any one or more of the computation device 10, the computation device 610, the quantum state generation device 620, or a portion thereof, may be implemented by the computer 700. In this case, the operation of each of the processing units described above is stored in the auxiliary storage device 730 in the form of a program. The CPU 710 reads the program from the auxiliary storage device 730, loads the program in the main storage device 720, and executes the processing described above according to the program. Furthermore, the CPU 710 reserves a storage area corresponding to each of the storage units mentioned above in the main storage device 720 according to the program.

The communication of each device with other devices is executed as a result of the interface 740 having a communication function and performing communication according to the control of the CPU 710.

The quantum chip 760 is a chip (circuit) that operates using quantum states according to quantum mechanics. The quantum chip 760 includes an oscillator that performs parametric oscillation, and the oscillator represents a quantum state. The quantum state of the oscillator undergoes transitions according to the control of the CPU 710. The quantum state of the oscillator can be used to perform quantum computing such as quantum annealing. The quantum chip 760 may be configured as a quantum device that is external to the main body of the computer 700.

The computer 700 may use the quantum chip 760 to generate a quantum state. Alternatively, the computer 700 may generate a quantum state in a simulation using the CPU 710.

When the computation device 10 is implemented by the computer 700, the operation of the control unit 200 and each of the units thereof is stored in the auxiliary storage device 730 in the form of a program. The CPU 710 reads the program from the auxiliary storage device 730, loads the program in the main storage device 720, and executes the processing described above according to the program.

Furthermore, the CPU 710 reserves a storage area in the main storage device 720 for the control unit 200 to perform processing according to the program. The communication between the computation device 10 and other devices is executed as a result of the interface 740 including a communication function and operating under the control of the CPU 710. The interactions between the computation device 10 and the user are executed as a result of the interface 740 having a display device and an input device, various images being displayed according to control by the CPU 710, and user inputs being accepted.

When the computation device 610 is implemented by the computer 700, the operation of the plan generation unit 611, the quantum state generation unit 612, and the computation unit 613 are stored in the form of a program in the auxiliary storage device 730. The CPU 710 reads the program from the auxiliary storage device 730, loads the program in the main storage device 720, and executes the processing described above according to the program.

Furthermore, the CPU 710 reserves a storage area in the main storage device 720 for the computation device 610 to perform processing according to the program. The communication between the computation device 610 and other devices is executed as a result of the interface 740 including a communication function and operating under the control of the CPU 710. The interactions between the computation device 610 and the user are executed as a result of the interface 740 having a display device and an input device, various images being displayed according to control by the CPU 710, and user inputs being accepted.

One or more of the programs described above may be recorded in the non-volatile recording medium 750. In this case, the interface 740 may read out the program from the non-volatile recording medium 750. Then, the CPU 710 directly executes the program that has been read out by the interface 740, or executes the program after temporarily saving it in the main storage device 720 or the auxiliary storage device 730.

A program for executing some or all of the processing performed by the computation device 10, the computation device 610, and the quantum state generation device 620 may be recorded in a computer-readable recording medium, and the processing of each unit may be performed by a computer system reading and executing the program recorded on the recording medium. The "computer system" referred to here is assumed to include an OS and hardware such as peripheral devices.

Furthermore, the "computer-readable recording medium" refers to a portable medium such as a flexible disk, a magnetic optical disk, a ROM (Read Only Memory), or a CD-ROM (Compact Disc Read Only Memory), or a storage device such as a hard disk built into a computer system. Moreover, the program may be one capable of realizing some of the functions described above. Moreover, the functions described above may be realized in combination with a program already recorded in the computer system.

Example embodiments of the present invention has been described in detail above with reference to the drawings. However, specific configurations are in no way limited to the example embodiment, and include designs and the like within a scope not departing from the spirit of the present invention.

The whole or part of some example embodiments above can be described as the supplementary notes below, but the example embodiments are not limited thereto.

Supplementary Note 1

A computation device, including: a memory configured to store instructions; and a processor configured to execute the instructions to: generate a plan that controls an oscillator configured to perform parametric oscillation such that an intensity of a pump signal that is input to the oscillator increases from a first value according to an elapsed time and then decreases to a second value, and a magnitude of a detuning between a resonance frequency of the oscillator and an oscillation frequency of the oscillator increases from a third value according to the elapsed time and then decreases to a fourth value; generate a quantum state of the oscillator by controlling the oscillator based on the plan; and perform computation using the generated quantum state.

Supplementary Note 2

The computation device according to supplementary note 1, wherein the processor is configured to execute the instructions to generate the plan such that the intensity of the pump signal shifts from increasing to decreasing after the magnitude of the detuning shifts from increasing to decreasing.

Supplementary Note 3

The computation device according to supplementary note 1 or supplementary note 2, wherein the processor is configured to execute the instructions to acquire information representing the quantum state obtained when the oscillator is controlled based on the generated plan, and update the plan based on acquired information.

Supplementary Note 4

The computation device according to supplementary note 3, wherein the processor is configured to execute the instructions to update the plan by performing, using an objective function that represents an evaluation of the quantum state of the oscillator, a search for a value of an internal parameter included in a first function and a value of an internal parameter included in a second function, the first function representing the intensity of the pump signal according to the elapsed time, the second function representing the magnitude of the detuning according to the elapsed time.

Supplementary Note 5

The computation device according to supplementary note 4, wherein each of the first value and the fourth value is 0, the first function is obtained by multiplying the second value by a polynomial in the elapsed time that takes a value of 0 when starting the control of the oscillator for generating the quantum state and takes a value of 1 when ending the control of the oscillator for generating the quantum state, and the second function is obtained by multiplying the third value by a polynomial in the elapsed time that takes a value of 1 when starting the control of the oscillator for generating the quantum state and takes a value of 0 when ending the control of the oscillator for generating the quantum state.

Supplementary Note 6

A quantum state generation device, including: a memory configured to store instructions; and a processor configured to execute the instructions to: generate a plan that controls an oscillator configured to perform parametric oscillation such that an intensity of a pump signal that is input to the oscillator increases from a first value according to an elapsed time and then decreases to a second value, and a magnitude of a detuning between a resonance frequency of the oscillator and an oscillation frequency of the oscillator increases from a third value according to the elapsed time and then decreases to a fourth value; and generate a quantum state of the oscillator by controlling the oscillator based on the plan.

Supplementary Note 7

A computation method including: generating a plan that controls an oscillator configured to perform parametric oscillation such that an intensity of a pump signal that is input to the oscillator increases from a first value according to an elapsed time and then decreases to a second value, and a magnitude of a detuning between a resonance frequency of the oscillator and an oscillation frequency of the oscillator increases from a third value according to the elapsed time and then decreases to a fourth value; generating a quantum state of the oscillator by controlling the oscillator based on the plan; and performing computation using the generated quantum state.

Supplementary Note 8

A quantum state generation method including: generating a plan that controls an oscillator configured to perform parametric oscillation such that an intensity of a pump signal that is input to the oscillator increases from a first value according to an elapsed time and then decreases to a second value, and a magnitude of a detuning between a resonance frequency of the oscillator and an oscillation frequency of the oscillator increases from a third value according to the elapsed time and then decreases to a fourth value; and generating a quantum state of the oscillator by controlling the oscillator based on the plan.

Supplementary Note 9

A program for causing a computation device configured to perform computation using an oscillator configured to perform parametric oscillation to execute: generating a plan that controls the oscillator such that an intensity of a pump signal that is input to the oscillator increases from a first value according to an elapsed time and then decreases to a second value, and a magnitude of a detuning between a resonance frequency of the oscillator and an oscillation frequency of the oscillator increases from a third value according to the elapsed time and then decreases to a fourth value; generating a quantum state of the oscillator by controlling the oscillator based on the plan; and performing computation using the generated quantum state. The program may be stored in a non-transitory computer-readable recording medium.

Supplementary Note 10

A program for a quantum state generation device configured to generate a quantum state of an oscillator configured to perform parametric oscillation by controlling the an oscillator, the program causing the quantum state generation device to execute: generating a plan that controls the oscillator such that an intensity of a pump signal that is input to the oscillator increases from a first value according to an elapsed time and then decreases to a second value, and a magnitude of a detuning between a resonance frequency of the oscillator and an oscillation frequency of the oscillator increases from a third value according to the elapsed time and then decreases to a fourth value; and generating the quantum state of the oscillator by controlling the oscillator based on the plan. The program may be stored in a non-transitory computer-readable recording medium.

What is claimed is:

1. A computation device, comprising:

a memory configured to store instructions; and a processor configured to execute the instructions to:

generate a plan that controls an oscillator configured to perform parametric oscillation such that an intensity of a pump signal that is input to the oscillator increases from a first value according to an elapsed time and then decreases to a second value, and a magnitude of a detuning between a resonance frequency of the oscillator and an oscillation frequency of the oscillator increases from a third value according to the elapsed time and then decreases to a fourth value;

generate a quantum state of the oscillator by controlling the oscillator based on the plan; and perform computation using the generated quantum state.

2. The computation device according to claim 1, wherein the processor is configured to execute the instructions to generate the plan such that the intensity of the pump signal shifts from increasing to decreasing after the magnitude of the detuning shifts from increasing to decreasing.

3. The computation device according to claim 1, wherein the processor is configured to execute the instructions to acquire information representing the quantum state obtained when the oscillator is controlled based on the generated plan, and update the plan based on acquired information.

4. The computation device according to claim 3, wherein the processor is configured to execute the instructions to update the plan by performing, using an objective function that represents an evaluation of the quantum state of the oscillator, a search for a value of an internal parameter included in a first function and a value of an internal parameter included in a second function, the first function representing the intensity of the pump signal according to the elapsed time, the second function representing the magnitude of the detuning according to the elapsed time.

5. The computation device according to claim 4, wherein each of the first value and the fourth value is 0, the first function is obtained by multiplying the second value by a polynomial in the elapsed time that takes a value of 0 when starting the control of the oscillator for generating the quantum state and takes a value of 1 when ending the control of the oscillator for generating the quantum state, and the second function is obtained by multiplying the third value by a polynomial in the elapsed time that takes a value of 1 when starting the control of the oscillator for generating the quantum state and takes a value of 0 when ending the control of the oscillator for generating the quantum state.

6. A computation method comprising:

generating a plan that controls an oscillator configured to perform parametric oscillation such that an intensity of a pump signal that is input to the oscillator increases from a first value according to an elapsed time and then decreases to a second value, and a magnitude of a detuning between a resonance frequency of the oscillator and an oscillation frequency of the oscillator increases from a third value according to the elapsed time and then decreases to a fourth value;

generating a quantum state of the oscillator by controlling the oscillator based on the plan; and performing computation using the generated quantum state.

* * * * *